(12) United States Patent
Fazio

(10) Patent No.: US 12,521,463 B2
(45) Date of Patent: Jan. 13, 2026

(54) AIR ENHANCING DEVICE

(71) Applicant: Revoltab AG, Zug (CH)

(72) Inventor: Livio Fazio, Unterägeri Zug (CH)

(73) Assignee: Revoltab AG, Zug (CH)

( * ) Notice: Subject to any disclaimer, the term of this patent is extended or adjusted under 35 U.S.C. 154(b) by 516 days.

(21) Appl. No.: 18/007,846

(22) PCT Filed: Jun. 2, 2021

(86) PCT No.: PCT/EP2021/064861
§ 371 (c)(1),
(2) Date: Dec. 2, 2022

(87) PCT Pub. No.: WO2021/245174
PCT Pub. Date: Dec. 9, 2021

(65) Prior Publication Data
US 2023/0226245 A1 Jul. 20, 2023

(30) Foreign Application Priority Data

Jun. 2, 2020 (CH) .................................... 00649/20

(51) Int. Cl.
*A61L 9/12* (2006.01)
*A61L 9/03* (2006.01)
*A61L 9/14* (2006.01)
*B01F 23/21* (2022.01)

(52) U.S. Cl.
CPC ................. *A61L 9/127* (2013.01); *A61L 9/03* (2013.01); *A61L 9/122* (2013.01); *A61L 9/14* (2013.01); *B01F 23/21* (2022.01); *A61L 2209/11* (2013.01); *A61L 2209/12* (2013.01); *A61L 2209/133* (2013.01); *A61L 2209/134* (2013.01);
(Continued)

(58) Field of Classification Search
CPC ................................. B01F 23/21; A61L 9/127
See application file for complete search history.

(56) References Cited

U.S. PATENT DOCUMENTS

| 10,143,953 B1 | 12/2018 | Lee et al. |
| 2017/0122616 A1 | 5/2017 | Calabro |

(Continued)

FOREIGN PATENT DOCUMENTS

| EP | 3653231 A1 | 5/2020 | |
| FR | 2918318 A1 * | 1/2009 | ........... B60H 3/0007 |
| WO | 2018009225 A1 | 1/2018 | |

*Primary Examiner* — Robert A Hopkins
(74) *Attorney, Agent, or Firm* — GrowIP Law Group LLC

(57) ABSTRACT

An air enhancing device (1) for disseminating molecules and/or other substances into the air is disclosed comprising a base frame (5) configured to be fixedly mounted in a wall, panel, or furniture of a human accessible space, in particular in an in-wall box or an in-wall cavity in a wall of a building; a cartridge holder (7) attached to the base frame (5) and configured to receive a removable cartridge, the cartridge being designed to contain a fluid substance; and a fan and/or microblower configured to draw air into the air enhancing device (1) and expel air containing at least a portion of the substance out of the air enhancing device (1) into the human accessible space; and/or an emission module attached to the base frame (5) in fluid communication with the cartridge and configured to distribute a portion of the fluid substance into the air.

20 Claims, 8 Drawing Sheets

Figure 1:
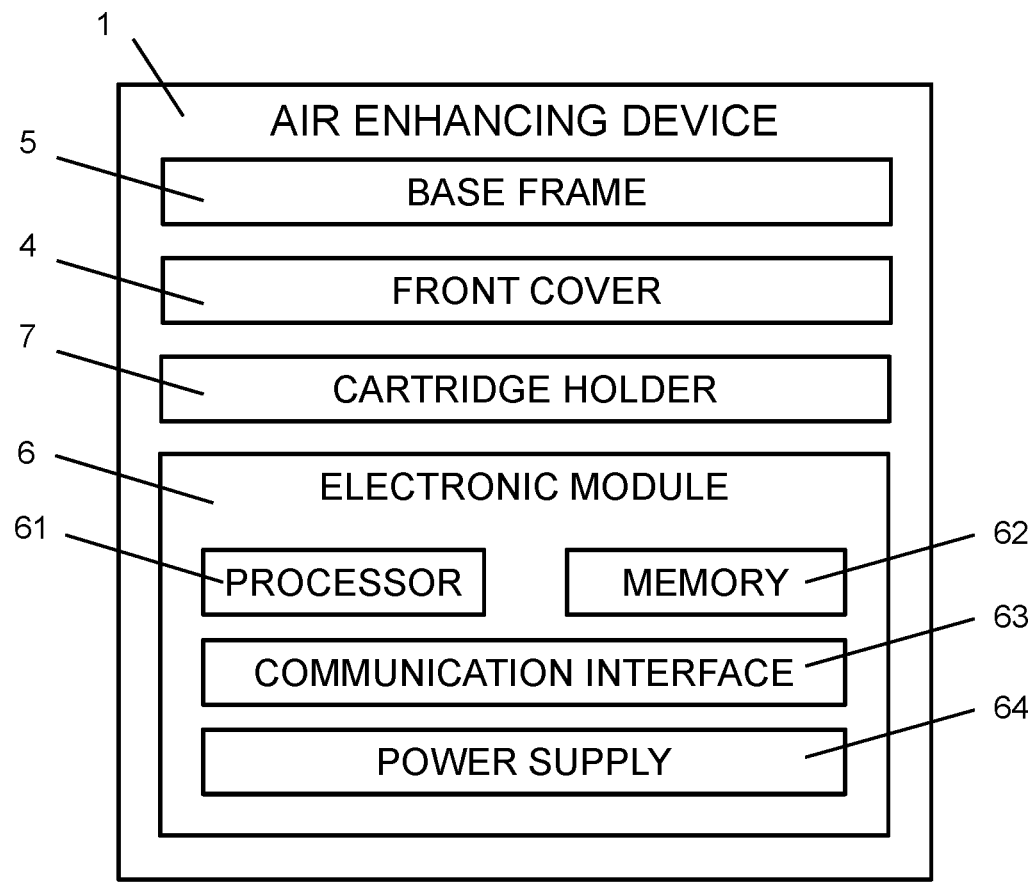

(52) U.S. Cl.
CPC ....... *A61L 2209/14* (2013.01); *A61L 2209/15* (2013.01)

(56) References Cited

U.S. PATENT DOCUMENTS

2017/0281821 A1 10/2017 Davis et al.
2018/0208024 A1 7/2018 Bauer et al.

* cited by examiner

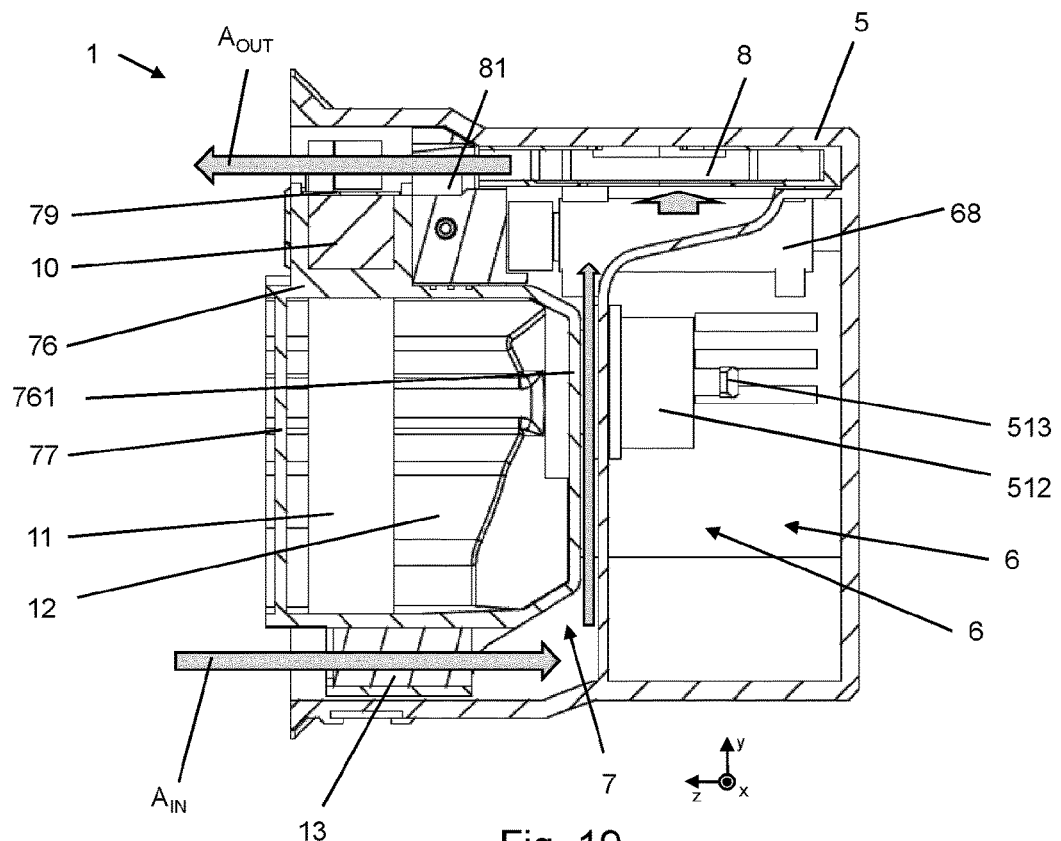
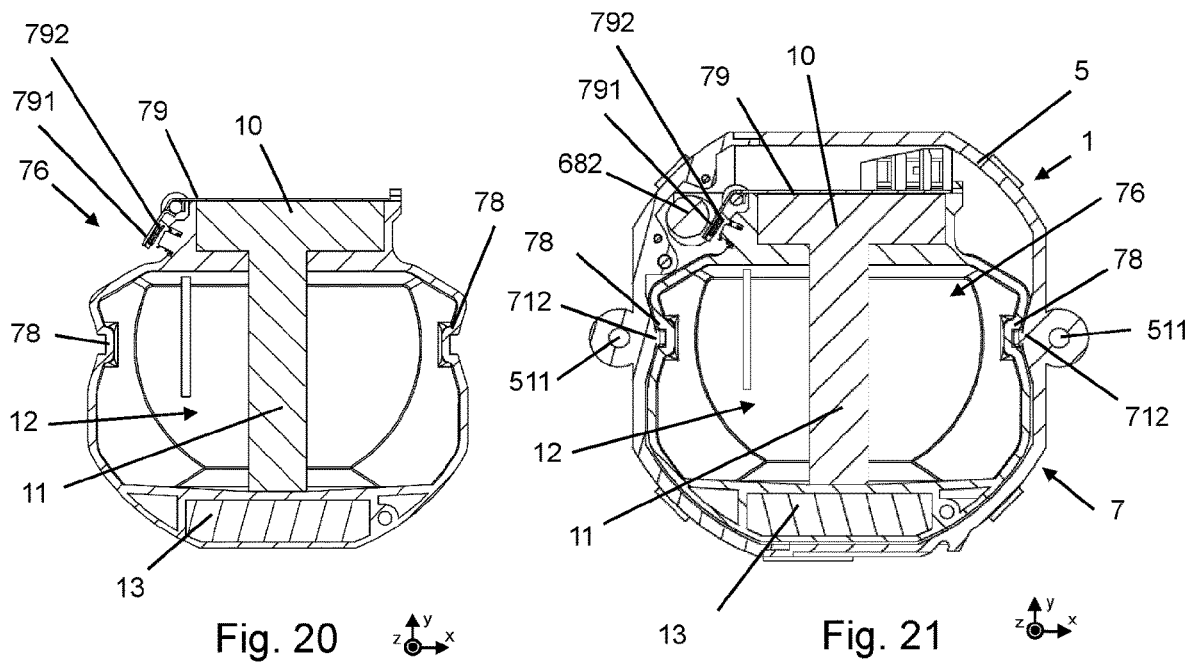

AIR ENHANCING DEVICE

CROSS-REFERENCE TO RELATED APPLICATIONS

This application is a U.S. National Stage Application that claims the benefit of the filing date of International PCT Application No. PCT/EP2021/064861, filed on Jun. 2, 2021, that claims priority to Swiss Patent Application No. CH00649/20, filed Jun. 2, 2020, that are hereby incorporated by reference in their entirety.

FIELD OF THE DISCLOSURE

The present disclosure relates to an air enhancing device. In particular, the present disclosure relates to an air enhancing device for disseminating molecules and/or other substances into the air, the air enhancing device including a base frame, a cartridge holder, and an emission module and/or fan and/or microblower.

BACKGROUND OF THE DISCLOSURE

Air enhancing devices are common in private and commercial settings, and are often used, for example, to improve the quality and/or the scent of the air, or to distribute insect repellent.

These air enhancing devices distribute various kinds of substances into the air, for example they can distribute odor-neutralizing substances, fragrant aromas and scents, stimulating substances, insect repellent substances, and so on.

Simple examples of air enhancing devices are scented candles and reed diffusors.

Electronic air enhancing devices are also known which use electronic means for distributing a substance into the air. These devices distribute the substance by use of an ultrasonic diffusor or a nebulizing diffusor and are typically placed on a table or shelf. Power is drawn either from an integrated battery or via a power cable connected to an electric wall-socket. Other small devices may be directly pluggable into an electric wall-socket.

These known devices have a number of disadvantages. The battery powered devices require the batteries to be frequently exchanged or recharged, whereas devices pluggable into an electric wall-socket are prone to damage from persons or objects coming up against them, and devices placed on tables or shelves and connected via a power cable can be knocked over or damaged, and the power cable can present a trip hazard.

Further, these devices often have an inconsistent output, cannot distribute the substance into a large space, and are, particularly in commercial settings, prone to theft.

US 2017/0122616 A1 discloses a smart multi-functional ceiling unit comprising a ventilation fan and light system. The ventilation fan is configured to extract air from a room, such as a bathroom, and discharge the air through a discharge housing to the outside, using a discharge hose or conduit. The ceiling unit is described as comprising a plurality of further components. Among these components, an air freshener reservoir and an air freshener actuator is mentioned.

SUMMARY OF THE DISCLOSURE

It is an object of this disclosure to provide an air enhancing device, which air enhancing device does not have at least some of the disadvantages of the prior art. In particular, it is an object of the present disclosure to provide an air enhancing device with improved functionality and/or ease of handling.

According to the present disclosure, these objects are achieved through the features of the independent claims. In addition, further advantageous embodiments follow from the dependent claims, claim combinations and from the description and the figures.

According to the present disclosure, the above-mentioned objects are particularly achieved in an air enhancing device for disseminating molecules and/or other substances into the air, in particular for disseminating a portion of a fluid substance into the air. The air enhancing device comprises a base frame configured to be fixedly mounted in a building or vehicle. The base frame is a structural component. The air enhancing device is configured to be mounted in a wall or panel of a human accessible space, for example in a wall of a building or in a panel of a vehicle. This can include outside walls of buildings, in particular for partially open spaces, such as balconies, verandas, patios, winter gardens, etc. A vehicle can include all manner of devices for human transportation, for example cars, trucks, busses, trains, trams, planes, ships, lifts, escalators, etc. In these vehicles, the air enhancing device can be fixedly mounted in a manner of ways appropriate to the vehicle in question. For example, in a car, the air enhancing device can be fixedly mounted in the door panels, in the dashboard, centre console, glove compartment, or other components in the passenger compartment. In a lift, the air enhancing device can be fixedly mounted in a panel, such as the control panel, the wall panel, or the ceiling panel. Fixedly mounted means that the air enhancing device is securely attached by mechanical means such as by a fastener, e.g. by screws, nails, bolts, or by an interference fit or the like, or by chemical means such as glue or other bonding methods, such that the air enhancing device cannot easily be removed.

The air enhancing device comprises a cartridge holder that can be attached to the base frame and is preferably configured to receive a removable cartridge. The cartridge holder can be attached to, or can be part of, the base frame. The cartridge holder is preferably designed to receive and retain in a removable manner, the cartridge. The cartridge is designed to contain the fluid substance. Throughout this application, the fluid substance can be a liquid and/or gaseous and/or gelatinous substance and/or a solid substance that can be fluidized, evaporated, sublimated, and/or a volatile substance. The cartridge consists of or comprises a shell or cover with a tank to store the fluid substance, along with an opening to allow the fluid substance to exit the cartridge. In an example, the opening comprises a valve or a wick. In an example, the cartridge includes a porous substance to retain the fluid substance, such as a polyurethane foam. In an example, the fluid substance can be in a gel form and/or a granulate form. The fluid substance can comprise a base, such as water, oil, or alcohol, as well as at least one fragrant compound, for example at least one volatile organic compound (VOC). The air enhancing device further or optionally comprises an emission module attached to the base frame and being in fluid communication with the cartridge and configured to distribute a portion of the fluid substance into the air. The air enhancing device therefore enhances the drawn-in air with the molecules and/or other substances contained in the fluid substance. To transport the fluid between the cartridge and the emission module, gravity, a wicking effect, and/or a pump or other means can be used. The cartridge can either directly be connected to the emission module, or a tube, wick, porous material or other means for fluid communication can be used to enable fluid communication between the cartridge and the emission module. The emission module obtains or receives the fluid substance from the cartridge and distributes at least a portion of the fluid substance into the air.

In an embodiment, the emission module is not part of the air enhancing device. The fluid substance is distributed into the air directly from the cartridge, in particular by diffusion of at least a portion of the fluid substance from the cartridge into the air.

In an embodiment, the emission module is arranged as part of the cartridge, which emission module is in fluid communication with a reservoir containing the fluid substance of the cartridge.

In an embodiment, the emission module is arranged in the cartridge above the reservoir and is in fluid communication with the reservoir. In particular, the emission module comprises a wick which extends into the reservoir. The wick draws the fluid substance from the reservoir into the emission module. Depending on the embodiment, the emission module can be arranged as part of the reservoir. The emission module can also be integrally formed with the wick. For example, the emission module comprises a porous body, e.g. porous polymer or porous ceramics or foam-like body functioning as the wick and being arranged at least partially in the reservoir. In embodiments of a solid porous wick body, e.g. polymer or ceramics, the wick body can have an upright T-shape with the vertical bar extending into the reservoir, preferably to the bottom of the reservoir, and the horizontal bar providing a large evaporation area for the enhancing fluid. In an embodiment, a cartridge comprises a plurality of tanks configured to contain a plurality of different fluid substances, with the cartridge further having a separate opening for each tank.

In an embodiment, the air enhancing device is mounted in a wall or panel, in particular is mounted in an in-wall box. An in-wall box is, for example, a recess in a wall of a building. Specific examples or other terms for in-wall boxes include installation boxes and flush-mounting boxes. In-wall boxes in buildings are commonly used as receptacles for electrical power outlets, light switches, dimmer switches, HVAC controls, etc. and are commonly manufactured and installed in a number of standard sizes and/or dimensions as is known to the person skilled in the art. The particular in-wall box of the invention can be selected depending on or compatible with the applicable norms and standards. The air enhancing device can be mounted in a wall or panel such that the bulk of the air enhancing device is largely concealed from view, e.g. by being mounted essentially flush to the wall or panel. By use of the in-wall box, only one side of the air enhancing device may be visible, the other sides being contained inside the wall or panel and therefore being not or less visible.

In an embodiment, the in-wall box is provided by the air enhancing device, and can form part of the base frame. In another embodiment, the in-wall box is formed by a cavity in a wall.

In an embodiment, the air enhancing device is fixedly mounted in a housing installed on an external surface of a wall.

In an embodiment, the air enhancing device can comprise a front cover arranged essentially flush with the wall or panel. In an example, the front cover is attached to the base frame of the air enhancing device. Essentially flush means that the front cover is substantially parallel and aligned with the wall or panel, though it is foreseen or comprises that particular embodiments of front covers will protrude from the wall, as is the case with many common light switch boxes, electrical power sockets, and other fixtures and devices mounted in in-wall boxes. The front cover is configured to allow air to pass into and/or out of the air enhancing device. To facilitate air movement into and/or out of the air enhancing device, the front cover is not airtight. In particular, the front cover has an opening to allow air to move into and/or out of the air enhancing device. For example, the opening is a mesh, textile, grill, a series of perforations, one or more gaps around the edge of the front cover, and/or a gap between the front cover and the remaining air enhancing device. The front cover, in an example, has one opening or area of openings for allowing air to pass into the air enhancing device and another opening or area of openings for allowing air to pass out of the air enhancing device. The front cover can be openable and can be configured to conceal the rest of the air enhancing device. The front cover is or can be openable such that access to the interior of the air enhancing device is enabled. In an example, the front cover comprises a hinge configured to allow the front cover to open. In an example, the front cover is removable such that it detaches from the remaining air enhancing device entirely. In an example, the front cover requires a particular key or other tool, and/or has a specific opening mechanism, to open and/or be removed. After opening the air enhancing device, the cartridge can be removed and a new cartridge can be inserted.

Throughout this application, the emission module and/or fan and/or microblower is configured to distribute the portion of the fluid substance through the front cover into the air. Further, the emission module can comprise the fan and/or microblower or instead the emission module is separate from the fan and/or microblower. In particular, depending on the embodiment, the emission module is arranged in the cartridge and the fan and/or microblower is arranged in the air enhancing device.

An example of a microblower is an air pump, for example an ultrasonic device, which can generate air pressure pulses and/or variations via an oscillating member. For example, an air pump can use the ultrasonic vibration of ceramics. An advantage is that a microblower can generate high discharge pressures of air from a compact, thin and silent.

In an embodiment, air enhancing device further comprises a particulate air filter configured to purify intake air flowing into the air enhancing device. The particulate air filter is arranged downstream from the front cover, through which air flows into the air enhancing device, and upstream from the emission module and/or fan and/or microblower, such that it receives purified air which has passed through the particulate air filter. In an example, the particulate air filter is removable and can be exchanged once the particulate air filter is clogged. In an example, the particulate air filter can be configured to be cleanable and access to the particulate air filter can be enabled after the front cover has been opened and/or removed. In one example, the air filter is a fine mesh or a fibre mat, such as a High-Efficiency Particulate Air (HEPA) filter. In another example, the particulate air filter further comprises a filter to filter volatile organic compounds, chemical vapours, and other odours, for example an activated carbon filter or a carbon cloth filter. In some embodiments, further filters are also foreseen for removing viral, bacterial and/or fungal particles from the air, thereby providing a health benefit.

In an embodiment, the air filter is arranged in the cartridge. In particular, the air filter is arranged such that air being drawn into the air enhancing device is drawn in at least partially through the air filter. The air filter can be configured to be removable from the cartridge.

In an embodiment, the air enhancing device further comprises an electronic module including a processor, a memory, a communication interface, and a power supply. The components of the electronic module can be arranged throughout the air enhancing device. The components of the electronic module can be interconnected using a connection mechanism. The electronic module, and components thereof, can be further connected to other components and modules of the air enhancing device, in particular the emission module, using the connection mechanism.

The term connection mechanism relates to a mechanism that facilitates power transmission and/or data communication between two modules, devices, systems, or other entities. The connection mechanism can be a wired connection across a cable or system bus, or wireless connection using direct or indirect wireless transmissions. The processor can comprise a central processing unit (CPU) for executing computer program code stored in the memory. The processor, in an example, can include more specific processing units such as application specific integrated circuits (ASICs), reprogrammable processing units such as field programmable gate arrays (FPGAs), and/or processing units specifically configured to accelerate certain applications. The memory can comprise one or more volatile (transitory) and/or non-volatile (non-transitory) storage components. The storage components may be removable and/or non-removable, and can also be integrated, in whole or in part with the air enhancing device. Examples of storage components include RAM (Random Access Memory), flash memory, hard disks, data memory, and/or other data stores. The memory has stored thereon computer program code configured to control the processor of the electronic module, such that the electronic module performs one or more steps and/or functions as described herein. Depending on the embodiment, the computer program code can be compiled or non-compiled program logic and/or machine code. As such, the electronic module can be configured to perform one or more steps and/or functions. The computer program code can define and/or be part of a discrete software application. One skilled in the art will understand, that the computer program code can also be distributed across a plurality of software applications. The software application is installed in the electronic module. Alternatively, the computer program code can also be retrieved and executed by the electronic module on demand. In an embodiment, the computer program code further provides interfaces, such as APIs (Application Programming Interfaces), such that functionality and/or data of the electronic module can be accessed remotely, such as via a client application or via a web browser. In an embodiment, the computer program code is configured such that one or more steps and/or functions are not performed in electronic module but in an external communication device, for example a mobile phone, and/or a remote server at a different location to the electronic module, for example in a cloud-based computer system.

In an embodiment, the processor and the memory are arranged in the same integrated circuit, for example in a microcontroller. The communication interface can be connected to the processor via a connection mechanism such as a bus, and may enable wireless and/or wired communication using one or more communication standards and/or protocols. The power supply provides power for the electronic module. Depending on the embodiment, the power supply comprises a step down transformer, inverter, and/or regulator to transform the supplied power to a voltage appropriate for the electronic module.

In an embodiment, the power supply is directly electrically connected to a power line in the wall, in particular a power line terminating in an in-wall box receiving the air enhancing device.

In an embodiment, the power supply comprises a battery. The battery can be removable from the air enhancing device after the front cover has been opened and/or removed.

In an embodiment, the battery is rechargeable. For example, the battery is rechargeable using electromagnetic induction.

In an embodiment, the power supply is connected to a photovoltaic module. The photovoltaic module can be installed on the front cover and/or on a front cover frame of the air enhancing device.

In an embodiment, the electronic module further comprises a fill-level detector configured to measure a fill-level of the cartridge and a communication interface configured to transmit to an external communication device a status message indicating the fill-level of the cartridge.

The external communication device can be, for example, a computer, more specifically a desktop or server computer, a mobile phone, a laptop, or tablet or similar computing device. An appropriate fill-level detector can be selected from known fill-level detectors according to the particular embodiment of the invention, for example a contactless hall-effect type can be used which detects the fill-level from outside the cartridge. The processor can be configured to periodically obtain a fill-level indicator from the fill-level detector, determine the fill-level of the cartridge using the fill-level indicator, and store the fill-level of the cartridge in the memory. The processor can be further configured to extrapolate a timeseries of fill-levels of the cartridge into the future to determine a point in time when the cartridge is predicted to be empty. The processor can be connected to the communication interface and be configured to generate the status message comprising a fill-level indicator and pass the status message to the communication for transmission to the external communication device. The external communication device is a computing device configured to receive the status message.

The communication interface can be configured for wired and/or wireless communication between the electronic module and the external communication device. Depending on the embodiment, the communication interface is configured to communicate with the external communication device via a communication network. The communication network can comprise the Internet as well as other intermediary networks. The wireless communication can take place using a mobile data network, such as GSM, CDMA and LTE networks, and/or a close range wireless communication interface using a Wi-Fi network, Bluetooth, RFID, NFC, and/or other wireless network type and standard. In an example, the processor of the electronic module provides an internal webserver which hosts a webpage, the webpage providing the user interface. The wired communication can take place either with a direct wired connection between the electronic module and the external communication device, for example with a USB or direct Ethernet connection, or the wired communication can take place indirectly via a network or intermediary device, such as via a power line communication or a wired LAN. For power line communication, the electronic module can be configured to transmit data to the external communication device via a power line connected to the power supply. The communication interface can be coupled to the power line and transmits data to the external communication device via the power line using a standard such as Ethernet over power line.

In an example, the wireless transmission is a direct Bluetooth transmission which enhances security as the wireless communication device must be in close proximity with the air enhancing device and therefore can prevent accidental or unauthorized transmission. In another example, the wireless transmission to the external communication device takes places via the WLAN network which increases the flexibility of the communication, as the external communication device does not have to be in close proximity with the air enhancing device.

In an embodiment, the electronic module is configured to determine a fill-state of the cartridge, in particular a fill-state of the reservoir of the cartridge. The electronic module is configured to determine the fill-state using one or more operating parameters of the air enhancing device. The operating parameters can include power supply parameters, such as relating to a consumed power of the air enhancing device. The operating parameters can include an active time of the air enhancing device, for example an operating time. The operating parameters can include a fan and/or microblower operating time and optionally a fan and/or microblower speed or power. The operating parameters can include an emission module operating parameter, in particular an operating time and/or operating intensity.

In an embodiment, the electronic module is configured to determine a replacement time point of the cartridge, for example using the fill-state. The replacement time can be determined for the present, i.e. configured to determine whether the cartridge is, or is expected to be, empty. The replacement time can also be determined for a time point in the future. In particular, the electronic module can be configured to use a history of operating parameters and a forecasting model to predict a time point in the future when the cartridge is to be replaced.

In an embodiment, the electronic module is configured to generate a message comprising the fill-state and/or whether the cartridge needs replacement. The message is configured to be transmitted using the communication interface. The message can be transmitted directly to the communication device. Alternatively, or additionally, the message can be transmitted to a remote server and can be forwarded to the communication device by the remote server.

In an embodiment, the electronic module comprises a cartridge reader configured to read a machine-readable cartridge identifier from the cartridge. The processor can be connected to the cartridge reader. In an example, the cartridge reader is configured for reading the cartridge identifier wirelessly from the cartridge, for example using radio frequency identification (RFID). In an example, the cartridge reader is configured for reading the cartridge reader in a wired manner from the cartridge, for example using a direct electrical connection to read a memory on the cartridge, for example an electrically erasable programmable read-only memory (EEPROM). The processor can be configured to receive from the cartridge reader the cartridge identifier and to determine authorization of the cartridge using the cartridge identifier and authorization data stored in the memory. The cartridge identifier is a unique identifier, for example an identifier which is unique for an individual cartridge to prevent misuse. For example, the cartridge identifier is an encrypted identifier. The authorization data is configured to enable the processor to check whether the cartridge identifier is legitimate. For example, the authorization data includes cryptographic keys allowing the processor to decrypt the encrypted cartridge identifier. Other examples include the cartridge identifier being digitally signed, and the authorization data enabling the processor to check the digital signature of the cartridge identifier. The processor can be configured to store an authorization confirmation in the memory, if positive authorization has been determined, and store an authorization denial in the memory, if negative authorization has been determined.

In an embodiment, the processor is configured to retrieve the authorization data, via the communication interface, from the external communication device. In an embodiment, the processor is configured to transmit the cartridge identifier, via the communication interface, to the external communication device. The external communication device, using the authorization data stored on a memory of the external communication device, can perform authorization using the cartridge identifier and the authorization data and can transmit the authorization confirmation or authorization denial to the processor of the air enhancing device, which stores the authorization confirmation or authorization denial in the memory.

In an embodiment, the processor is configured to transmit the cartridge identifier to a remote server. The authorization data stored on the remote server can comprise a database of valid cartridge identifiers, and the remote server can check whether the cartridge identifier transmitted from the processor of the air enhancing device is valid or not, and can transmit back to the processor of the air enhancing device an authorization confirmation or an authorization denial. In addition to transmitting an authorization confirmation or an authorization denial, the remote server, in an example, transmits a time-lock code, which is configured to enable the air enhancing device to use the particular cartridge only for a particular time-period.

In an embodiment, if positive authorization has been determined, the air enhancing device is activated and is operational, and if negative authorization has been determined, the air enhancing device is deactivated and is not operational. In particular, the processor of the electronic module is configured to switch the air enhancing device, in particular the emission module and/or fan and/or microblower and/or other active electronic components, into an activated or deactivated state depending on whether positive authorization or negative authorization has been determined, respectively.

In an embodiment, the air enhancing device further comprises an electronic actuator configured to unlock and/or open the front cover. The communication interface is configured to receive an unlock message from the external communication device, and the processor is configured to determine access authorization, using the unlock message, and if positive access authorization is determined, to send an unlock signal to the electronic actuator to unlock and/or open the front cover, and if negative access authorization is determined, to not send the unlock signal.

In an embodiment, the air enhancing device further comprises a fan. Alternatively, or additionally, the air enhancing device comprises a microblower. The fan and/or microblower are configured to draw air into and/or expel air out of the air enhancing device. An embodiment having a fan has an advantage that a fan can move a relatively large amount of air. A microblower, for example a piezoelectric microblower, has an advantage that it takes up relatively little space.

In a preferred embodiment, the particulate air filter is arranged upstream from the fan and/or microblower, ensuring that only clean air arrives at the fan or microblower which prolongs its lifespan as no dust or other particles foul the fan or microblower. In an exemplary arrangement, the emission module is placed upstream from the fan and/or microblower, between the particulate air filter and the fan and/or microblower. In another exemplary arrangement, the emission module is placed downstream from the fan and/or microblower, such that the fan and/or microblower is placed between the particulate air filter and the emission module.

In an embodiment, the emission module comprises a thermal inkjet head. The thermal inkjet head comprises a heating element which heats the fluid substance above the boiling point of the fluid substance forming a pocket of gas which expels a portion of the fluid substance through one or more small openings of the thermal inkjet head into the air. By using a thermal inkjet head very small droplets of at least a portion of the fluid substance are generated which remain in the air for a long duration such that the fluid substance is used with greater efficiency.

In an embodiment, the emission module comprises a piezoelectric inkjet head. The piezo-electric inkjet comprises one or more piezoelectric elements which periodically alter the volume inside the piezoelectric inkjet head, generating a pumping action which pushes a portion of the fluid substance through one or more small openings into the air. By using a piezoelectric inkjet head very small droplets of at least a portion of the fluid substance are generated which remain in the air for a long duration such that the fluid substance is used with greater efficiency.

In an embodiment, the emission module comprises an ultrasonic diffusor. The ultrasonic diffusor is an ultrasonically vibrating membrane which generates a fine mist of droplets of the fluid substance in the air.

In an embodiment, the emission module comprises a nebulizing diffusor, in which pressurized air moving past the fluid substance generates a fine mist of drops of the fluid substance in the air.

In an embodiment, the emission module comprises an aerosol sprayer.

In an embodiment, the emission module comprises a cold evaporator.

In an embodiment, the emission module comprises a heating element. The heating element increases the rate at which the fluid substance evaporates, in particular the rate at which the at least one volatile organic compound (VOC) in the fluid substance diffuse into the air.

In an embodiment, the air enhancing device further comprises an input-output module connected to the electronic module, in particular connected to the processor. In an embodiment, the input-output module is arranged such that the input-output module is accessible only when the front cover is opened. In an embodiment, one or more parts of the input-output module are accessible even when the front cover is closed. The input-out module can include a human-machine interface (HMI), comprising, for example, a status LED, an on-off button and/or a knob. The status LED indicates whether the air enhancing device is powered on. The status LED, in an example, further indicates whether the cartridge has been positively authorized or whether it has been negatively authorized. The status LED, in a further example, indicates the fill-level of the cartridge, in particular indicates when the cartridge is empty or near-empty. The knob can control a rate at which the fluid substance is emitted into air by the air enhancing device. In particular, the processor of the electronic module can be configured to obtain from the knob a rate-setting and to alter a control set point of the emission module and/or the fan. Specifically, at a high rate setting the processor is configured to increase the rate at which droplets are generated by the emission module and to increase the fan speed.

Figure 2:
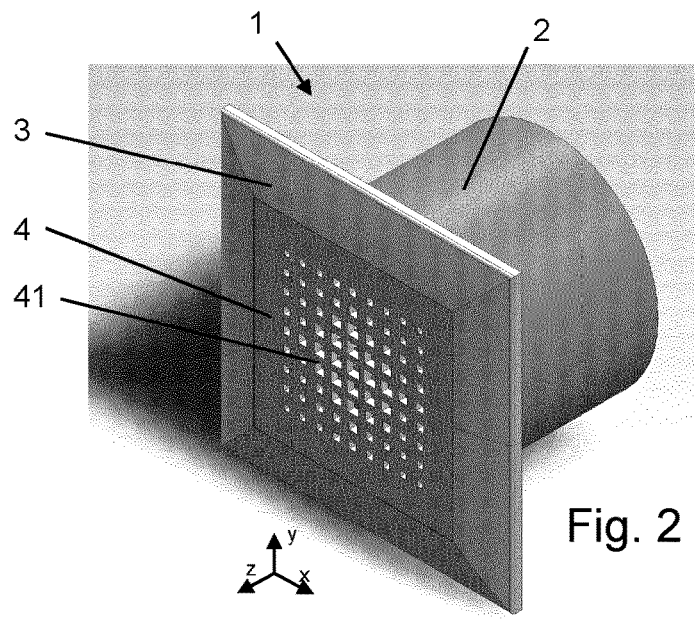
Figure 3:
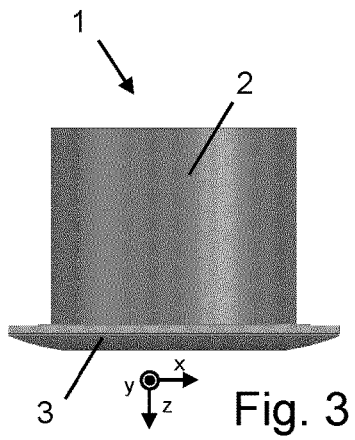
Figure 4:
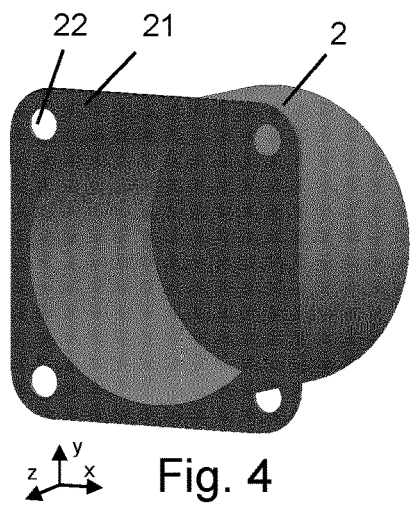
Figure 5:
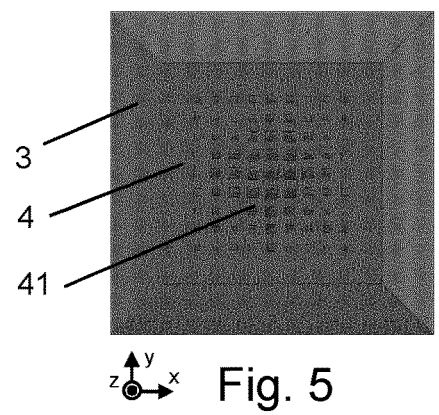
Figure 6:
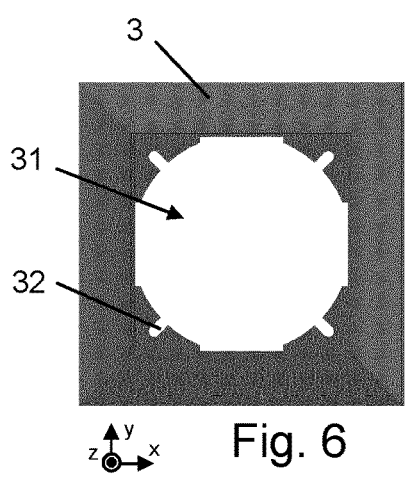
Figure 7:
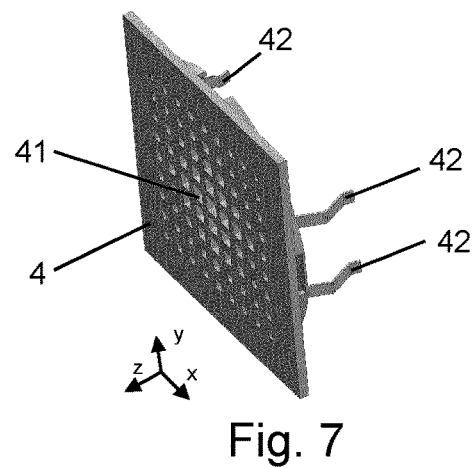
Figure 8:
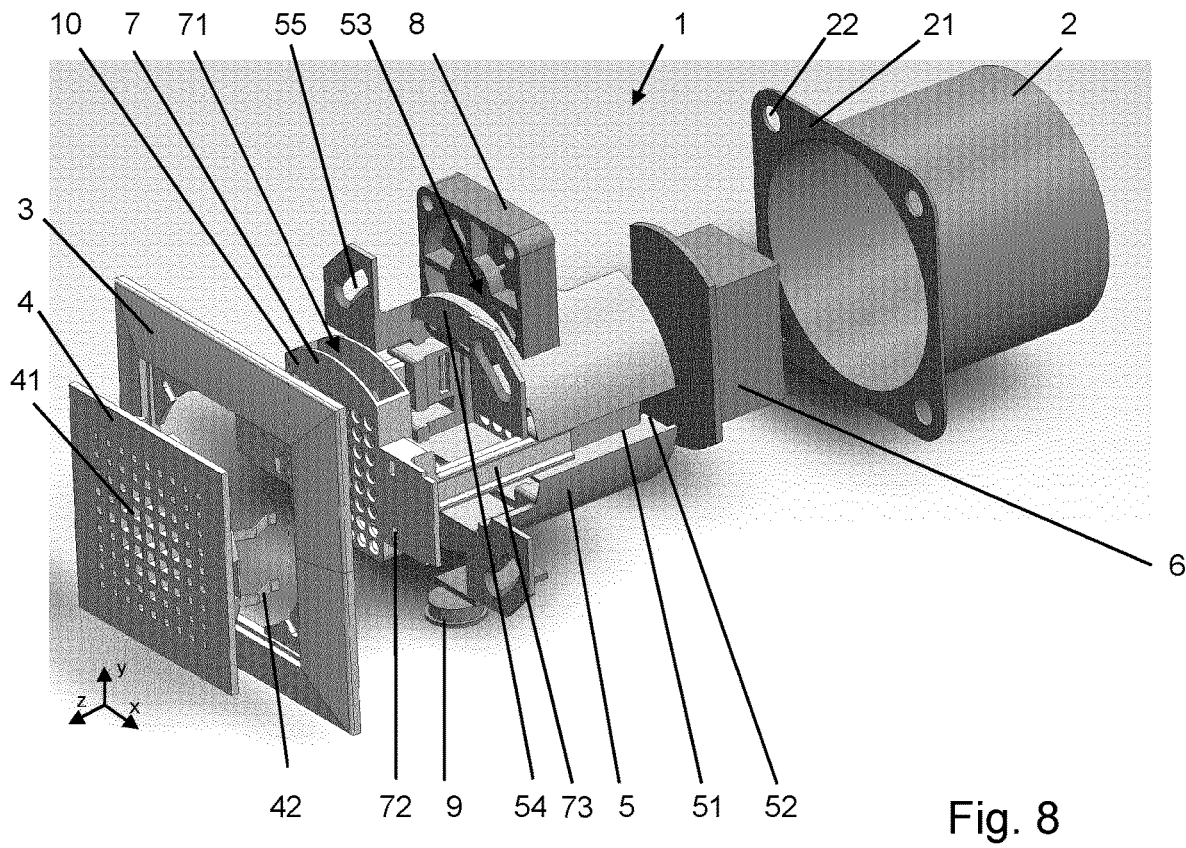
Figure 9:
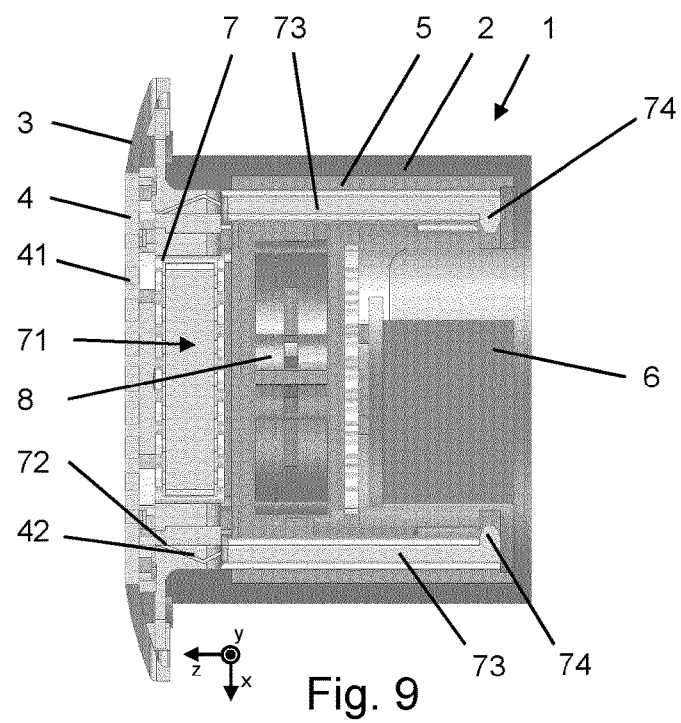
Figure 10:
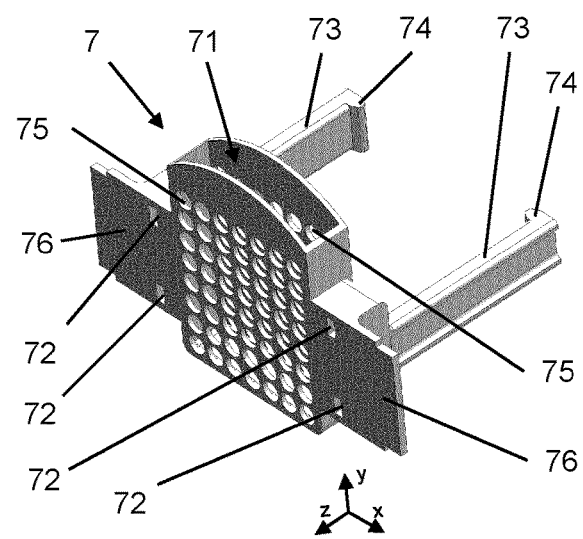
Figure 11:
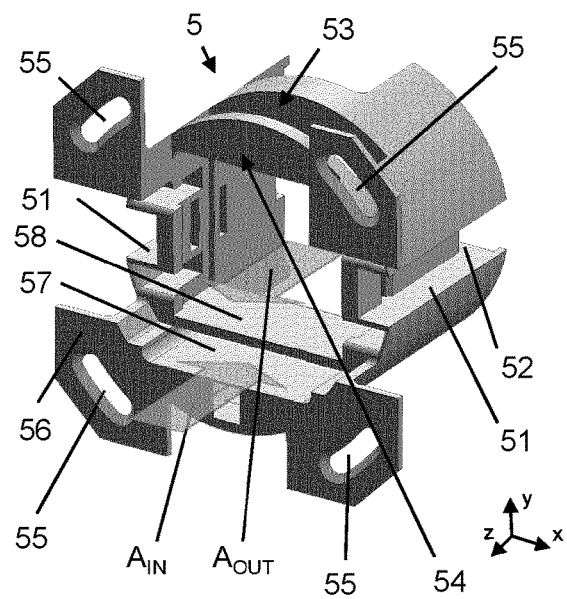
Figure 12:
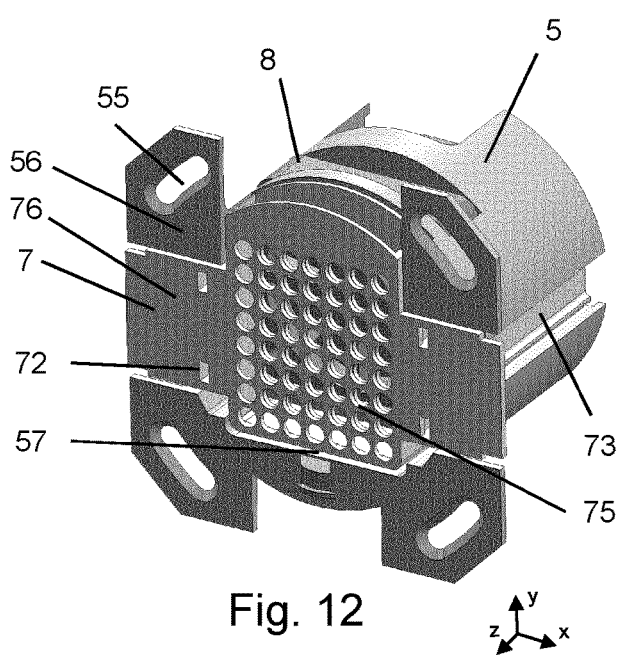
Figure 13:
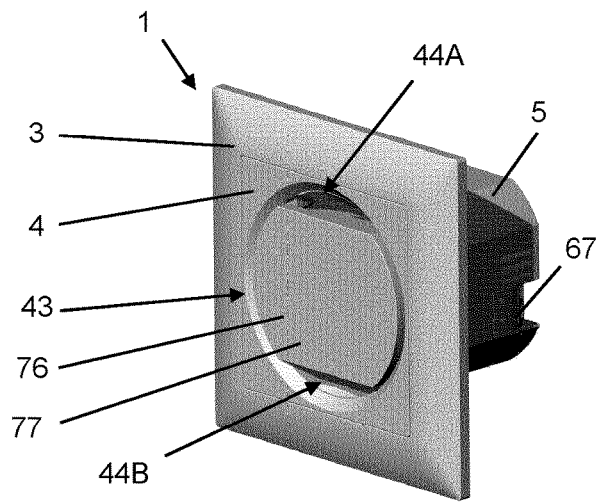
Figure 14:
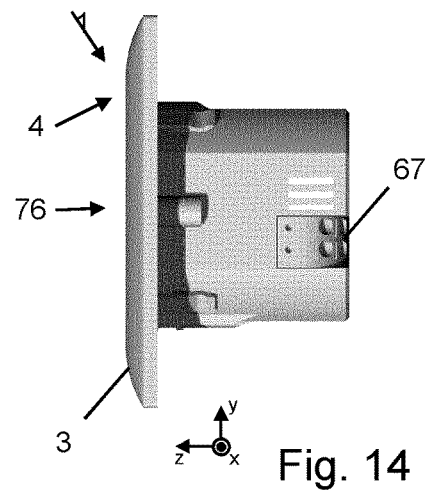
Figure 15:
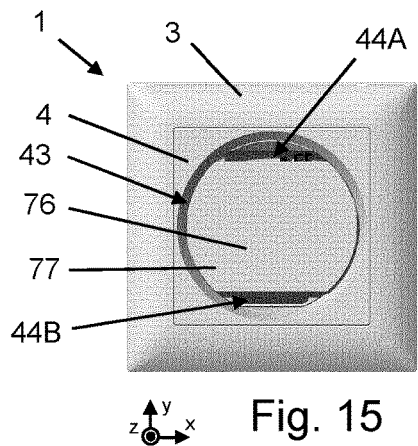
Figure 16:
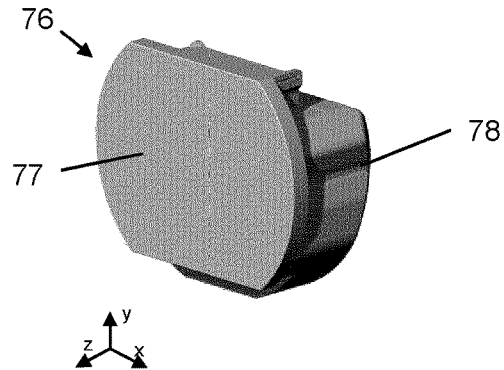
Figure 17:
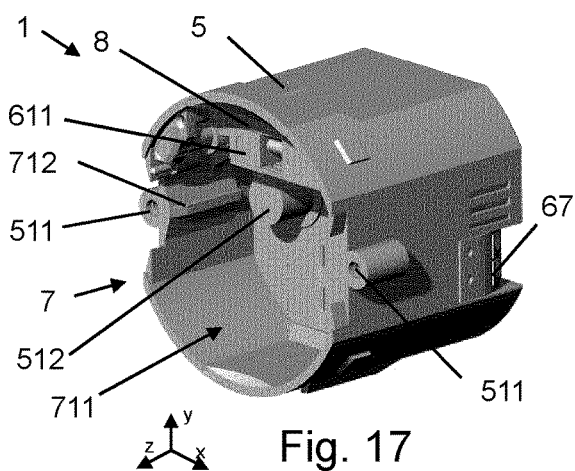
Figure 18:
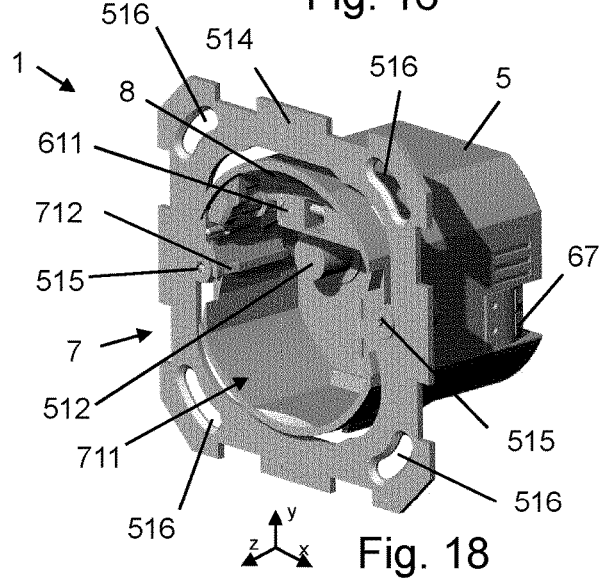
Figure 22:
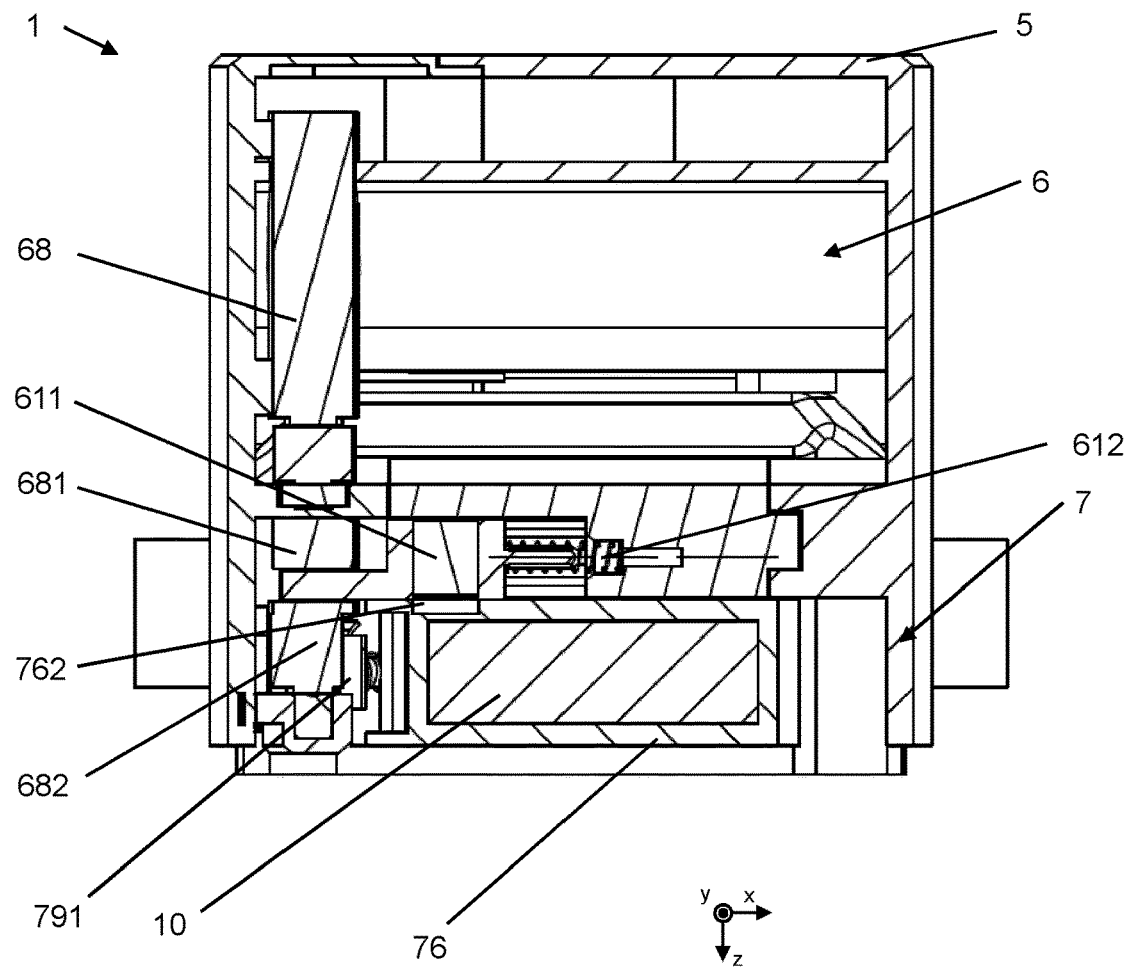
Figure 23:
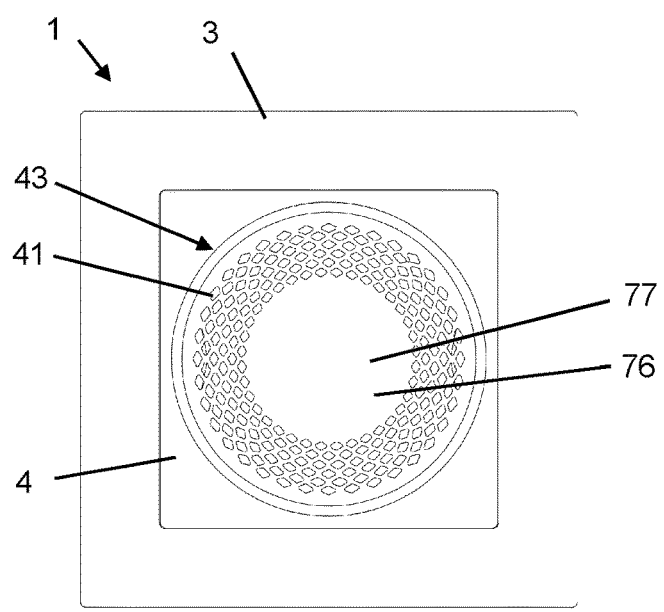
Figure 24:
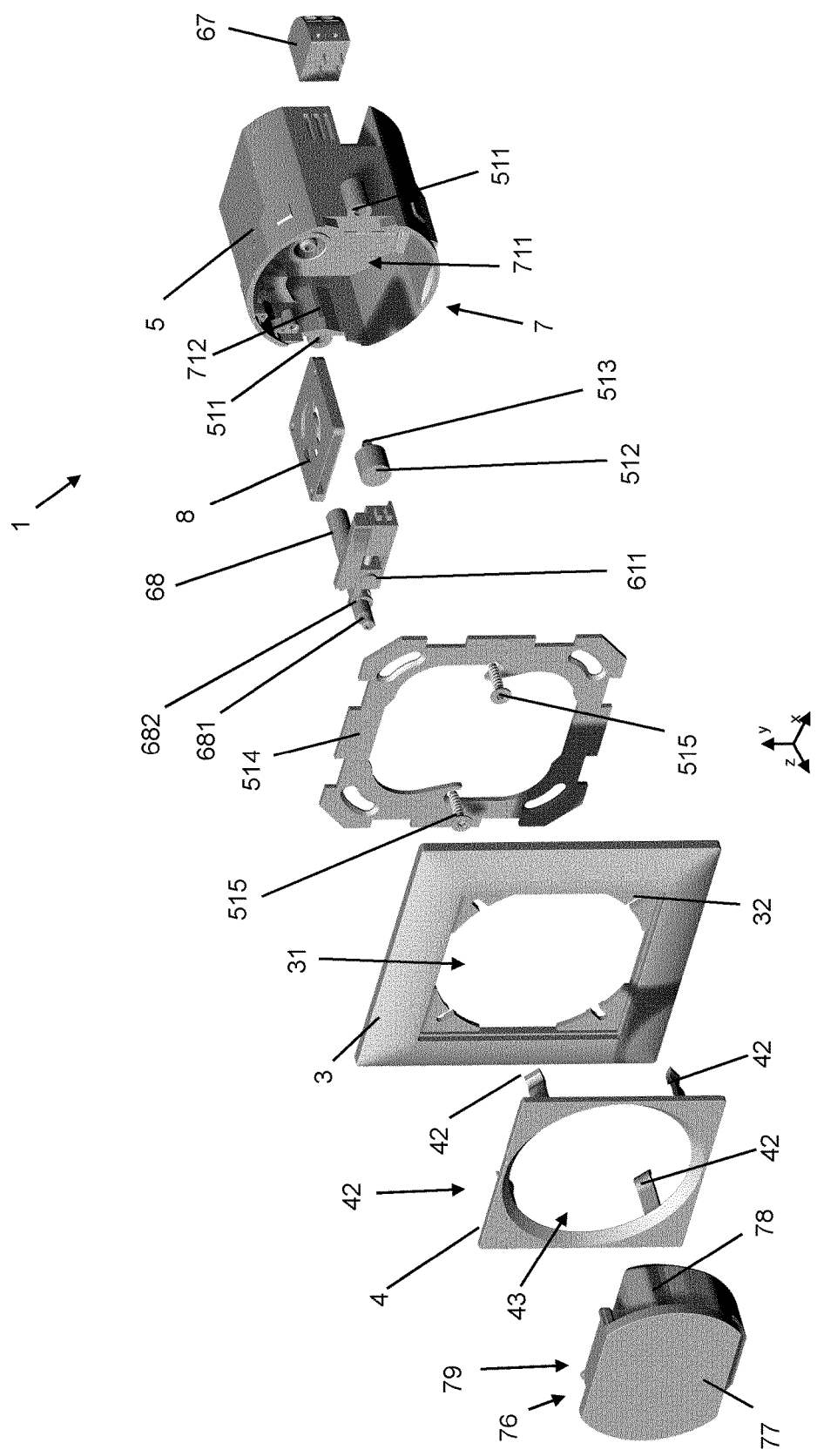

In an embodiment, the input-output module, in particular the HMI, can comprise an acoustic transducer for transmitting acoustic messages to the user, a microphone for receiving voice activated commands or for detecting the presence of users in the vicinity of the device, a mini-display for displaying information relating to the state of the air enhancing device, a projector for projecting an image onto the ground below the air enhancing device, and/or other HMI modules. The input-output module is configured to act as an intermediary between the HMI and the processor such that the processor receives from the user and transmits to the user messages.

In an embodiment, the input-output module comprises an electrical socket for powering connected devices.

In an embodiment, the input-output module comprises a socket for direct wired communication, for example between the external communication device and the processor. For example, the socket is a universal serial bus (USB) socket.

In an embodiment, the cartridge holder is configured to receive a plurality of cartridges containing a plurality of different fluid substances. This enables the air enhancing device to generate a dynamic experience in which e.g. different fluid substances can be emitted at different times, and in which different combinations of fluid substances can be emitted, in different proportions, at different times. The emission module is configured to be in fluid communication with the plurality of cartridges. The emission module can be configured such that each of the plurality of fluid substances is emitted at a set emission rate individually. For example, the emission module can comprise a plurality of thermal inkjet heads, a particular thermal inkjet head being connected to a particular cartridge, such that the emission of the particular fluid substance can be controlled by the particular thermal inkjet head. The air enhancing device, in particular the processor, can be configured to control the emission of each fluid substance of each particular cartridge using an air enhancement or aroma emission program stored in the memory, the aroma emission program determining time intervals and intensities of emission for each particular cartridge. In an example, the processor is configured to receive the aroma emission program, or receive data for updating the aroma emission program, from the external communication device.

In an embodiment, the fluid substance of the cartridge comprises scents, perfumes, essential oils, medicaments, volatile organic compounds, insect repellents, bactericides, disinfectants, and/or anti-viral agents.

In an embodiment, the processor is further configured to determine a point in time of the cartridge requiring refilling or replacement, using a plurality of measured fill-levels of the cartridge. The processor can be further configured to transmit a refill message, using the communication interface, to the external communication device, the refill message indicating the point in time of the cartridge requiring refilling or replacement. The refill message enables a user to know in advance that a cartridge must soon be replaced or refilled.

In an embodiment, the processor is further configured to receive, using the communication interface, from the external communication device, operating commands indicating one or more of: an intensity of emission, a time-interval of emission, or a type of emission. The operating commands can be sent directly from the external communication device or transmitted indirectly via an intermediate communications network. The processor is configured to use the received intensity of emission to control the emission module and/or the fan and/or microblower. The emission module is controlled such that a higher received intensity of emission results in a faster rate of emission of the fluid substance and/or a faster fan or microblower speed. The processor can be configured to use the received time-interval of emission to control the emission module and/or the fan or microblower such that the fluid substance is emitted only during the time-interval as indicated by the time-interval of emission. The processor can be configured to use the received type of emission to control the emission module such that, in the case where the air enhancing device has multiple cartridges containing multiple fluid substances, one or more fluid substances are disseminated according to the type of emission. In an example, the intensity of dissemination is different for each fluid substance. This enables the air enhancing device, for example, to switch from dissemination of one type of fluid substance to another type of fluid substance gradually, by slowly ramping down the rate of emission of a first fluid substance from a first cartridge while simultaneously slowly ramping up the rate of emission of a second type of fluid substance from a second cartridge.

In an embodiment, the processor is configured to store in the memory an emission program comprising an intensity of emission, a time-interval of emission, and/or a type of emission. This emission program can be configured to control the processor to set a control point for the emission module and/or the fan speed or microblower speed. The processor can be configured to receive update messages from the external communication device emission program, which update messages comprise either a complete updated emission program, or comprise edit messages such that the processor uses the edit messages to update the emission program stored in the memory.

In addition to an air enhancing device, the present disclosure also relates to a cartridge containing a fluid substance configured for use with an air enhancing device as described above. The cartridge is configured to be removably attached to a cartridge holder.

In an embodiment, the cartridge further includes a machine-readable cartridge identifier configured to be read by a cartridge reader of the air enhancing device. The machine-readable cartridge identifier is, in an example, an EEPROM configured to be read by direct electrical contact between the cartridge and the cartridge reader. In another example, the cartridge identifier is an RFID tag configured to be read wirelessly by an RFID reader in the cartridge reader.

In an embodiment, the cartridge identifier further includes one or more of: a cartridge type, a cartridge content type indicating a contained type of fluid substance, a cartridge volume indicator, a cartridge expiry date, other cartridge data (e.g. manufacturer, production date, refill date, etc.).

In an embodiment, the cartridge further comprises a fill-level detector configured to be read by the cartridge reader of the air enhancing device.

In an embodiment, the cartridge further comprises a particulate air filter configured to purify intake air flowing into the air enhancing device. This has the benefit of not requiring the particular air filter to be cleaned, as it can simply be replaced with the cartridge. Further, by including the air filter with the cartridge and not having a separate air filter using the air enhancing device is quicker and easier, as the filter and the cartridge do not need to be separately maintained.

In addition to an air enhancing device and a cartridge for use in the air enhancing device, the present disclosure also relates to a computer program product comprising a non-transient computer-readable medium having stored thereon computer program code configured to control a processor of an external communication device. The computer program code is configured such that the external communication device performs the step of receiving, from an air enhancing device as described above, one or more of: an identifier message comprising the cartridge identifier, a status message indicating the fill-level of the cartridge, an authorization message indicating an authorization confirmation or an authorization denial, or a refill message indicating a time-point of the cartridge requiring refilling or replacement. Depending on the embodiment, the computer program code is compiled or non-compiled program logic and/or machine code. The computer program code is or can be configured to be executed on the external communication device. The computer program code is or can be distributed in the form of a discrete application. One skilled in the art will understand, that the computer program code can also be distributed across a plurality of software applications, and that the plurality of software applications can be executed in a distributed or decentralized manner across a plurality of devices including not only the external communication device but other computers, servers, or computing devices.

In an embodiment, the computer program product is further configured to control the processor of the external communication device such that the external communication device performs the step of transmitting to the air enhancing device one or more of: an emission program including time intervals and intensities of emission of the fluid substance, a type of fluid substance to emit, an unlock message configured to control the air enhancing device to unlock and/or open the front cover.

In an embodiment, the computer program product is further configured to perform a commissioning of the air enhancing device. The computer program product can be configured to control the external communication device to transmit to the air enhancing device, in particular the processor of the air enhancing device, an emission program, comprising an intensity of emission, a time-interval of emission, and/or a type of emission. This emission program is configured to control the processor of the air enhancing device to set a control point for the emission module and/or the fan speed and/or microblower performance. The external communication device can be configured to transmit to the processor of the air enhancing device update messages, which update messages can comprise either a complete updated emission program, or can comprise edit messages configured to enable the processor of the air enhancing device to update the emission program stored in the memory.

In an embodiment, the computer program product can be further configured to control the external communication device to communicate with a plurality of air enhancing devices to enable the external communication device to read status messages from the plurality of air enhancing devices and control the plurality of air enhancing devices simultaneously or jointly.

BRIEF DESCRIPTION OF THE DRAWINGS

The present disclosure will be explained in more detail, by way of example, with reference to the exemplary drawings in which:

FIG. 1: shows a block diagram of an air enhancing device;

FIG. 2: shows perspective view of an air enhancing device fixedly mounted to an in-wall box;

FIG. 3: shows a lateral plan view of an air enhancing device fixedly mounted to an in-wall box;

FIG. 4: shows a perspective view of an in-wall box;

FIG. 5: shows a front view of an air enhancing device;

FIG. 6: shows a front view of a front cover frame;

FIG. 7: shows a perspective view of a front cover;

FIG. 8: shows a perspective view of an exploded air enhancing device along with an in-wall box;

FIG. 9: shows a section view of an air enhancing device fixedly installed in an in-wall box;

FIG. 10: shows a perspective view of a cartridge holder of an air enhancing device;

FIG. 11: shows a perspective view of a base frame of an air enhancing device;

FIG. 12: shows a perspective view of a cartridge holder attached to a base frame;

FIG. 13: shows a perspective view of an air enhancing device with an inserted cartridge;

FIG. 14: shows a side view of an air enhancing device;

FIG. 15: shows a front view of an air enhancing device with an inserted cartridge;

FIG. 16: shows a perspective view of a cartridge;

FIG. 17: shows a perspective view of a base frame of an air enhancing device;

FIG. 18: shows a perspective view of a base frame of an air enhancing device attached to a mounting frame;

FIG. 19: shows a lateral section view of an air enhancing device with an inserted cartridge;

FIG. 20: shows a front section view of a cartridge;

FIG. 21: shows a front section view of a cartridge inserted into an air enhancing device;

FIG. 22: shows a top section view of an air enhancing device with an inserted cartridge;

FIG. 23: shows a front view an air enhancing device with an inserted cartridge; and FIG. 24: shows an exploded perspective view of an air enhancing device along with a mounting frame and a cartridge.

DESCRIPTION OF THE EMBODIMENTS

FIG. 1 shows a block diagram of an exemplary air enhancing device. Reference numeral 1 refers to an air enhancing device configured to be fixedly mounted such that it is largely concealed from view. In particular, the air enhancing device 1 is configured to be fixedly mounted such that only a front cover 4 is visible, the remainder of the air enhancing device 1 being concealed from view due to it being installed in a wall or in a panel or other fixture. The front cover is openable and/or removable such that access to the interior of the air enhancing device 1 is enabled. The air enhancing device 1 comprises a base frame 5, which is a structural component onto which other components are mounted. One skilled in the art understands that other components forming part of the air enhancing device 1 can be manufactured as part of the base frame 5. The air enhancing device 1 comprises a cartridge holder 7 configured to hold a cartridge 76 (not shown). The cartridge holder 7 is, in an example, manufactured as part of the base frame 5.

In an embodiment, an emission module 10 is configured to be in fluid communication with the cartridge 76 such that a fluid substance contained in the cartridge is communicated from the cartridge 76 to the emission module 10.

In an embodiment, the cartridge 76, the cartridge holder 7, and the emission module 10 are combined into one or two components which are not considered part of the air enhancing device 1. For example, the cartridge 76 and the cartridge holder 7 are combined into a single component which is removably attached to the base frame 5. In another example, the cartridge 76, the cartridge holder 7, and the emission module 10 are combined into a single component which is removably attached to the base frame 5 of the air enhancing device 1 and this single component is exchanged as the cartridge 76, in particular a reservoir 12 of the cartridge 76, runs out of the fluid substance.

The air enhancing device 1 further includes means for drawing air into and/or expelling air out of the air enhancing device 1, for example a fan 8 or a microblower. In an example, the fan 8 is a radial fan configured to draw air into the fan 8 axially (in embodiments in vertical direction upwards), e.g., from underneath the fan, and to expel the air radially (in embodiments in horizontal direction outwards). In particular, the fan 8 is configured with a fan shroud 81 to expel the air out of the air enhancing device 1 back into the human accessible space.

The exemplary air enhancing device further comprises an electronic module 6. The electronic module preferably includes a processor 61, a memory 62, a communication interface 63, and a power supply 64. As explained above, the processor 61 can be a general purpose processing unit such as a central processing unit (CPU), a specifically programmed processing unit, such as an application specific integrated circuit (ASIC), or a combination thereof. Additionally, in an embodiment, the processor 61 and the memory 62 are combined in a microcontroller. The processor 61 is connected to the various other components of the electronic module 6, and can also be connected to other components of the air enhancing device 1, such as the emission module 10.

FIG. 2 shows a perspective view of an embodiment of an air enhancing device 1 fixedly mounted to an in-wall box 2, which itself is preferably designed for fixed mounting in a wall of a building or vehicle or even piece of furniture. The air enhancing device 1 is manufactured from a plastic or metal. In particular, the air enhancing device 1 is designed such that all basic mechanical or housing parts can be manufactured using injection moulding. The front cover 4 of the air enhancing device 1 is visible, along with a front cover frame 3. The front cover 4 is shown as having an opening in the form of a plurality of perforations 41 which allow air to pass into and out of the air enhancing device 1. A wall (not shown) is oriented along the X-Y plane such that only the front cover 4 and the front cover frame 3 are visible. In an embodiment, the in-wall box 2 remains entirely contained in the wall. One skilled in the art understands that instead of a wall, a ceiling, a panel, an item of furniture, a fixture, or other object also serves the purpose of providing a suitable mounting location for fixedly mounting the air enhancing device 2 such that the air enhancing device 2 is, apart from the front cover 4 and the front cover frame 3, largely or completely concealed from view. Apart from walls in buildings, the air enhancing device 1 can also be configured to be fixedly mounted in vehicles, for example in a panel or component in the passenger cabin such as a door panel, a centre console, or a dashboard. The front cover 4 is essentially flush with the wall. Other arrangements, where the front cover 4 protrudes from the wall further, or where the front cover 4 has a bulbous or other non-flat shape are also foreseen.

FIG. 3 shows the air enhancing device 1 of FIG. 2 from a lateral plan view.

FIG. 4 shows the cylindrical in-wall box 2 without the air enhancing device 1 installed. In this exemplary figure the in-wall box has a depth of 50 mm and a cylindrical diameter of 64 mm. In other examples, the in-wall boxes can have other dimensions or other shapes, such as shapes with a square or rectangular cross section. The in-wall box 2 shown has a number of mounting holes 22 on a square face 21 of 72 mm in length and width. The in-wall box 2 is fixedly installed to the wall using screws, bolts, or similar means which pass through the mounting holes 22 to secure the in-wall box 2 to the wall.

FIG. 5 shows a front view of the air enhancing device 1 with the front cover 4 having a plurality of perforations 41.

FIG. 6 shows the front cover frame 3 on its own. The front cover frame 3 is configured to be arranged largely or completely flush with the wall surface (not shown) oriented in the X-Y plane. The front cover frame 3 has a recess 31 configured to receive the front cover 4, along with a number of gaps 32 which align with the mounting holes 22 of the in-wall box 2 such that the front cover frame 3 is mounted to the wall using the same means as described above.

FIG. 7 shows the front cover 4 on its own. The front cover has perforations 41 configured to allow air to pass through the front cover 4. The normal of the front cover 4 faces in the positive z-direction. Retaining clips 42 extend from the back of the front cover 4 in the negative z-direction. The retaining clips 42 are flexible mechanical fasteners which act as clips and engage with the remaining air enhancing device 1, in particular recesses 72 in the cartridge holder 7 as shown in FIG. 8, to removably retain the front cover 4 on the air enhancing device 1.

FIG. 8 shows an exploded perspective view of an exemplary air enhancing device 1 along with the in-wall box 2. The base frame 5 is a substantially cylindrical structure extending in the z-direction which is designed to fit into the in-wall box 2 and is shown on its own in more detail in FIG. 11. The base frame 5 has mounting holes 55 used to mount the base frame 5 to the in-wall box 2. The cartridge holder 7 is designed to be removably attached to the base frame 5 through two retaining beams 73 which engage with the base frame 5, as shown in more detail in FIGS. 10 and 12. The base frame 5 is configured to receive a fan 8, in particular an axial fan with fan axis oriented horizontally, in a fan slot 53, which fan slot 53 is a rectangular opening on the upper surface of the base frame 5. Alternatively or in addition to the fan 8, a microblower (not shown) can be arranged in the air enhancing device 1. The electronic module 6 is shown towards the back of the air enhancing device 1 in the negative z-direction. The electronic module 6 is connected with a power line (not shown) entering through the back of the in-wall box 2. Depicted is a knob 9 which is connected to the electronic module 6 for manually adjusting a fan speed of the fan 8 or a microblower performance, for example a speed, a frequency, or a power.

The in-wall box 2 is placed into an in-wall cavity, into a cavity in a wall, or simply in a hole in a panel, fixture, item of furniture, or other desired mounting location. The base frame 5 with the attached electronic module 6, fan 8, and rotary knob 9 is inserted into the in-wall box 2 such that the mounting holes 22 of the in-wall box 2 line up with the mounting holes 55 of the base frame 5. The cartridge holder 7 is then attached to the base frame 5 by a snap fit of the retaining beams 73 sliding along recesses 51 in the base frame 5 and then engaging with a further recess 52 arranged on the back of the base frame 5. The front cover 4 and the front cover frame 3 are then removably attached to the cartridge holder 7 by means of the retaining clips 42 by a snap fit of the retaining clips 42 through recesses 72 of the cartridge holder 7.

To remove the cartridge holder 7, the front cover 4 is first removed by pulling the front cover 4 in the positive z-direction. A tool may be required to grasp the front cover 4. The cartridge holder 7 is then removed by pulling in the positive z-direction. The cartridge holder 7 is configured to receive a cartridge 76 (not shown) in a slot 71. In the shown embodiment, the emission module 10 is part of the cartridge holder 7, in particular the cartridge holder 7 forms an emission module 10 by having a plurality of holes such that air can circulate through the cartridge 76, which in the shown embodiment is an air-permeable cartridge 76 such that the fluid substance contained therein can directly interface with air passing through the cartridge 76 such that a portion of the fluid substance is transferred from the cartridge 76 into the air.

FIG. 9 shows a section view of the air enhancing device 1 along a centre line of the air enhancing device 1 in the X-Y plane. Particularly visible in this section view is how the front cover 4 is removably engaged with the cartridge holder 7 by means of the retaining clips 42 engaging in a snap fit through recesses 72 of the cartridge holder 7. The cartridge holder 7 is removably engaged with the base frame 5 by the retaining beams 73 which engage in a removable snap fit with the hooks 74 of the retaining clips engaging in a removable fashion with a shoulder of the base frame 5.

FIG. 10 shows a perspective view of the cartridge holder 7. The cartridge holder 7 comprises a thin (in the z-direction) substantially rectangular body extending in the X-Y plane. The rectangular body is hollow with an opening at the top (in the positive y-direction) leading to a central chamber 71 configured to receive the cartridge 76 (not shown). The rectangular body has a plurality of perforations 75 in the front (positive z-direction) and back (negative z-direction) faces, configured to allow air to pass into and out of the cartridge 76. Extending in the positive and negative x direction are two wings 76 featuring the recesses 72 which are configured to receive the retaining clips 42 of the front cover 4 such that the front cover 4 is removably fastened to the cartridge holder 7. Extending from each of the wings 76 in the negative z-direction is a retaining beam 73, configured to engage in a releasable snap fit with the base frame 5.

FIG. 11 shows an exemplary perspective view of the base frame 5. The base frame 5 has a substantially cylindrical body with a centre line in parallel with the z axis. The front facing side of the base frame 5, in the positive z direction, has a number of skirt sections 56 extending from the edge of the cylindrical body outwards in the X-Y plane, the skirt sections 56 comprising mounting holes 55 configured to receive fastening means for mounting the base frame 5 to the in-wall box 2, in particular for mounting the base frame 5 and the in-wall box 2 to the wall (not shown). The base frame 5 has, on the sides of the cylindrical body, two recesses 51 extending in the negative z-direction and configured to receive the retaining beams 73 of the cartridge holder 7. The rear face of the cylindrical body, in the negative z-direction, has two further recessed shoulders 52 connected to the recesses 51 and configured to engage in a releasable manner with the hooks 74 of the retaining beams 73. At the top of the base frame 5 in this view, i.e. in the positive y direction, the cylindrical body has a curved rectangular cut-out 53 configured to receive the fan 8 or microblower. The fan 8 is mounted inside the cylindrical body of the base frame 5 such that the axis of rotation of the fan 8 lies in parallel with the centre axis of the cylindrical body. The fan 8 abuts against a shelf 58 lying in the X-Y plane such that the fan 8 covers a portion of the inside area of the cylindrical body. When the fan 8 is turned on, an air movement is generated in the positive z-direction out of the base frame 5 as indicated by the arrow $A_{OUT}$. Air is drawn in underneath the shelf 58 and along a bottom section of the cylindrical body as indicated by the arrow $A_{IN}$. The air being expelled from the air enhancing device 1 carries a portion of the fluid substance.

FIG. 12 shows a perspective view of the cartridge holder 7 attached to the base frame 5. The cartridge holder 7 is configured such that the wings 76 fit between the skirt sections 56 of the base frame 5. The bottom (in the negative y direction) of the cartridge holder 7 rests on a second shelf 57 of the base frame 5 while the rectangular body of the cartridge holder 7 covers the cylindrical body of the base frame 5 such that substantially all of the air being drawn into the cylindrical body of the base frame 5 and exiting out of the cylindrical body of the base frame 5 passes through the cylindrical holder 7, more precisely through the perforations 75 of the cylindrical holder 7.

FIG. 13 shows a perspective view of an air enhancing device 1 according to an embodiment of the invention. The front cover 4 has a cut-out section 43, in this case a circular cut-out section with a conical profile. The cartridge 76 is configured to insert into the air enhancing device 1, the cartridge 76 being designed to have a front plate 77 which is flush with the front cover 4 when inserted. The front plate 77 of the cartridge 76 an at least partially complementary shape to the cut-out section 43 such that a good fit is ensured and still the front plate 77 and the cut-out section 43 are designed to leave two gaps 44A and 44B for permitting air flow into and out of the air enhancing device 1.

The cartridge 76 is guided into the cartridge holder 7 (not shown) of the air enhancing device 1. The cartridge holder 7 has a guide rail in the form of a protrusion which is elongated in the direction of insertion, which is represented by the −z direction in the Figures. The cartridge 76 has a complementary recess which is designed to slidably engage which the protrusion such that the cartridge 76 is insertable into the air enhancing device 1.

The cartridge 76 is held in place inside the air enhancing device 1 using retaining means of the cartridge holder 7 which may vary depending on the embodiment. For example, the cartridge 76 has retaining means and is held in place in the cartridge holder 7 of the air enhancing device 1 using a removable snap-fit. In another example, the cartridge holder 7 has retaining means and holds the cartridge 76 in place using a removable snap-fit.

In an embodiment (see FIG. 15-19), the air enhancing device 1, in particular the cartridge holder 7, comprises an ejector 512 which includes a biasing member 513, for example a spring. The cartridge 76 is inserted against the ejector 512. The ejector 512 is displaced against the biasing member 513. The cartridge 76 is held in place in the inserted state by retaining means 611 which have a retaining force exceeding a biasing force of the biasing member 513. For example, a retaining means 611 comprise a removable snap-fit connector. In another example, the retaining means 611 comprise magnetic retaining means, such as including a permanent magnet or an electromagnet installed in the air enhancing device 1. The retaining means 611 are designed such that the retaining force of the retaining means is greater than the biasing force of the biasing member, such that the cartridge 76 remains securely held in place inside the air enhancing device 1. The biasing member 513 ensures that when the retaining force of the retaining means 611 is overcome, for example by pulling on the cartridge 76 by hand, the cartridge 76 springs out and can be removed easily by hand. In another example, the air enhancing device 1 contains an actuator 68 (see also FIG. 19) configured to eject the cartridge 76 from the cartridge holder 7. The actuator 68 can eject the cartridge 76 by pushing the cartridge 76 out of the cartridge holder 7.

In an embodiment, the ejector 68 displaces the cartridge 76 from its inserted position at least far enough for the force of the biasing member 513 to overcome the retaining force of the retaining means 611, thereby causing the biasing member 513 to further eject the cartridge 76 from the cartridge holder 7. It is not required for the cartridge 76 to be completely ejected from the cartridge holder 7. In another example, the retaining means 611 are rendered inactive such that the cartridge 76 springs out under force from the retaining means 611.

In an embodiment (see also FIG. 22), the retaining means 611, in particular the magnetic retaining means, comprises a retaining magnet configured to magnetically engage with the cartridge 76. For example, the retaining magnet 611 is configured to magnetically engage with a cartridge magnet 762 arranged in the cartridge 76 such that when the cartridge 76 is inserted into the air enhancing device 1, in particular the cartridge holder 7, the cartridge magnet 762 faces and attaches to the retaining magnet 611.

In an embodiment, the actuator 68 is configured to displace the retaining magnet 611 to remove the retaining force maintaining the cartridge 76 in the cartridge holder 7. For example, the actuator 68 is configured to laterally displace the retaining magnet 611 from an initial position in which it is adjacent to the cartridge magnet 762 to a final position in which it is at least partially non-adjacent to the cartridge magnet 762, such that the biasing force of the biasing member 513 is sufficient to overcome the magnetic retaining force.

In an embodiment, the actuator 68 is a stepper motor 68 which has an ejection cam 681 configured to engage with the retaining means 611 such that a rotation of an axle of the stepper motor 68 results in the lateral displacement of the retaining means 611 from the initial position to the final position. The retaining means 611 can have a retaining means biasing member, e.g. spring, which displaces the retaining means 611 back to an initial displacement after either a further rotation or a back-rotation of the axle of the stepper motor 68.

In an embodiment, the air enhancing device 1 includes a push to release mechanism which removably holds the cartridge 76.

FIG. 14 shows a side view of the air enhancing device 1 showing in particular the front plate 3 which, on its back side is flat such that the air enhancing device 1 is installable flush against a wall or a panel. Further, it can be seen that the front (in the +z direction) of the air enhancing device 1 is substantially flat apart from the slight curvature of the front cover frame 3. In particular, it can be seen that the front cover 4 and the cartridge 76 are flush. A power connector 67 is shown having four electric terminals. Depending on the embodiment, a different number of electric terminals is also possible, in particular two electric terminals. The power connector 67 is connected inside the air enhancing device to the power supply 64. The embodiment shown having four electric terminals is advantageous as it enables the air enhancing device 1 to be efficiently wired using an existing power line in the wall. This is achieved by cutting the power line and wiring the power connector 67 between both ends the newly created ends of the power lines, respectively, such that the power connector 67 is effectively inserted into the power line. In particular, two of the electric terminals are designated as a phase input and a ground input, respectively, and wired to one side of the power line. The remaining two electric terminals are designated as a phase output and a ground output, respectively, and wired to the other side of the power line. The air enhancing device 1 therefore is connected to the power line. This configuration allows the air enhancing device 1 to be easily retrofitted into existing buildings without requiring additional jumper cables or the use of electric terminal blocks, for example.

FIG. 15 shows a front view of the air enhancing device 1. Similar features are visible as in FIG. 13. In particular, the cut-out section 43, the cartridge 76 fitting inside the air enhancing device 1, and the two gaps 44A and 44B for permitting air flow into and out of the air enhancing device 1.

FIG. 16 shows a perspective view of the cartridge 76. The cartridge 76 has a preferably flat front plate 77 with a substantially circular shape which is truncated on the top and bottom. Further visible is an elongated recess 78 in the side of the cartridge 76 which is designed to slidably engage with a complementary protrusion of the air enhancing device 1 for inserting the cartridge 76. A second elongated recess (not visible) is found on the opposite side of the first elongated recess 78.

The cartridge 76 comprises a reservoir 12 (see also FIG. 19-21) configured to contain a fluid substance. The cartridge 76 is configured to maintain the reservoir 12 in a closed or sealed state when the cartridge 76 is not inserted into the air enhancing device 1, such as to prevent escape of the fluid substance or a portion thereof. The cartridge 76 can be configured such that when it is inserted into the air enhancing device 1 or when it is activated or opened after having been inserted into the air enhancing device 1, the reservoir 12 changes to an unsealed state. For example, in the unsealed state, fluid communication with the air enhancing device 1 is enabled, such that the fluid substance, or a portion thereof, contained in the reservoir 12 may flow into the air enhancing device 1. For example, the cartridge 76 is configured such that at least a portion of the fluid substance is disseminated into an interior space of the air enhancing device 1, such as by using an emission module 10 of the cartridge 76 in fluid communication with the reservoir 12.

The emission module 10 can be active, e.g. a piezo-electric diffusor, or can be passive, e.g. a porous membrane or foam designed to enable diffusion and/or evaporation of at least a portion of the fluid substance into the air. The emission module 10 is, for example, a porous polymer which can extend at least partially into the reservoir 12 and functions as a wick. The emission module 10, may also comprise a separate wick 11 which fluidly connects the emission module 10 with the reservoir 12.

The sealing and unsealing of the reservoir 12 is achieved, for example, by a pivotable member of the cartridge 76, such as a flap 79, which can cover the emission module 10. The flap 79 can uncover the emission module 10 by moving from a sealed to an unsealed state when the cartridge 76 is inserted into the air enhancing device 1. Moving from a sealed to an unsealed state can occur as a direct result of inserting the cartridge 76 into the cartridge holder 7 using opening means of the cartridge holder 7 configured to engage the flap 79 as the cartridge 76 is inserted into the cartridge holder 7, thereby opening the flap 79.

Moving from a sealed to an unsealed state can also occur using an actuator 68, for example a stepper motor 68, controlled by the air enhancing device 1, the actuator 68 being configured to engage with the flap 79 to open it.

In an embodiment, the stepper motor can have, in addition or as alternative to the ejection cam 681 described herein, a flap cam 682 configured to engage with the flap 79, such that a rotation of the flap cam 682 against the flap 79 results in the flap opening. The emission module 10 is then exposed to the air, resulting in distribution of at least a portion of the fluid substance into the air.

In an embodiment, a single stepper motor 68 is configured both to open the flap 79 and to eject the cartridge 76. In particular, the single stepper motor 68 is configured with both the flap cam 682 and the ejection cam 681, wherein the flap cam 682 and ejection cam 681 are designed such that when the stepper motor 68, in particular the axle of the stepper motor 68, rotates about a first angle range from an initial position, the flap cam 682 engages with the flap 79, and when the axle rotates about a second angle range from the initial position, which second angle range is non-overlapping with or larger than the first angle range, the ejector cam 682 engages with the retaining means 611, causing the ejector 512 to eject the cartridge 76 from the air enhancing device 1.

The cartridge 76 comprises machine readable information including a machine-readable cartridge identifier 612. Additionally, depending on the embodiment, the cartridge 76 comprises further machine readable information, including authorization data. The machine readable information can be stored in an RFID tag. The machine readable information can also be stored in another form of computer readable information, such as non-volatile memory, e.g. EEPROM.

In an embodiment, the cartridge 76 has one or more air channels configured such that air moving through the cartridge 76 moves past the reservoir 12 and/or an emissions module 10 in fluid communication with the reservoir 12 such that at least a portion of the fluid is absorbed into the air. For example, the cartridge 76 can be configured to have one or more air channels in which one end of the one or more air channels terminates on the front plate 77 of the cartridge 76.

FIG. 17 shows a perspective view of the air enhancing device 1. The air enhancing device 1 has a base frame 5 which is substantially cylindrical. The cartridge holder 7 is formed as part of the base frame 5. The cartridge holder 7 has a recess 711 designed to fit the cartridge 76. The cartridge holder 7 further has two elongated protrusions 712 (only the first being visible due to the angle of the perspective view) which are arranged on opposite inside faces of the recess 711 and configured to slidably engage with a complementary elongated recess (i.e. a groove) on the cartridge 76 to guide the cartridge 76 into place. The base frame 5 further has two screw receptacles 511, for engaging with attachment means, such as a screw or a bolt, for installing the air enhancing device 1 into the wall or panel, in particular into an in-wall cavity or an in-wall box (such as an inlet box).

In an embodiment, the air enhancing device 1, in particular the base frame 5 has a depth (an extension the z-direction) and a cylindrical size (a radial extension in the x-y plane) such that the air enhancing device 1 fits in an in-wall cavity or an in-wall box of standardized dimensions. In particular, the depth of the air enhancing device 1 is less than 50 mm. Further in particular, the width and height of the air enhancing device 1 is less than 50 mm by 50 mm.

Retaining means 611 are shown along with ejector 512. The retaining means 611 are configured to magnetically hold a cartridge 76 in an installed position. The ejector 512 is shown corresponding to a state when the cartridge 76 is not inserted into the device. When the cartridge 76 is inserted, the ejector 512 moves in the −z direction against the biasing mechanism 513 (see FIG. 19) of the ejector 512.

FIG. 18 shows a perspective view of the air enhancing device 1 fixed by screws 515 to a mounting frame 514, which mounting frame 514 is designed for being installed onto a wall or panel, such that the air enhancing device 1 is itself installed onto a wall or panel, in particular in a human accessible space, such as a room, of a building. The mounting frame 514 has mounting holes 516 configured such that screws or other fastening means can hold the mounting frame 514 against the wall or panel. The dimensions of the mounting frame 514 pose a constraint on a cross-sectional shape of the cartridge 76 in the x-y plane. The frame 514 comprises mounting points for the screws 515, which mounting points can present an additional constraint on the cross-sectional shape of the cartridge 76.

FIG. 19 shows a lateral section view of the air enhancing device 61 with the cartridge 76 in an inserted state. This view in particular shows how the air flows through the air enhancing device 1. The air enhancing device 1, in particular the radial fan 8 with fan axis oriented vertically, draws air in at the bottom through the air filter 13 of the cartridge 76, as indicated by the arrow $A_{IN}$. The air is drawn up along a backside of the cartridge 76, in particular between the cartridge 76 and the cartridge holder 7. The air is then sucked into the bottom of the fan 8, which in this embodiment is a radial fan 8 configured to drawn air in axially and expel it radially. The fan 8 then expels the air out of the device via a fan shroud 81 which is configured to direct the expelled air over the emission module 10. The fan shroud 81 is configured to direct the air expelled from the fan 8 in a substantially horizontal direction, preferably inclined slightly downwards towards an upper surface of the emission module 10, in particular to blow along and grazingly onto a top portion of the porous wick body or in general along and grazingly onto a surface of the emission module 10.

The flap 79 of the cartridge 76, which in this FIG. 19 is shown in the closed state, is opened to a raised state allowing the expelled air to pass over the emission module 10 such that the fluid substance, or a portion thereof, is incorporated into the air, for example via evaporation, which herein may include sublimation or diffusion or other passive molecule-dispersing effects in air. The flap 79 can be configured to guide the expelled air in conjunction with the fan shroud 79 slightly or grazingly onto the emission module 10. The expelled air, enriched with the fluid substance or a portion thereof, then passes out of the air enhancing device 1 as indicated by the arrow $A_{OUT}$. The expelled air is passed back into the same human accessible space from which the air was drawn in.

The cartridge 76 encloses a reservoir 12 which holds the fluid substance. A wick 11 can extend from the emission module 10 into the reservoir 12, preferably to the bottom of the reservoir 12. In this example, the wick 11 and the emission module 10 are integrally formed from a porous polymer designed to draw the fluid substance up through the wick 11 to the upper surface of the emission module 10. The wick 11 can, depending on the embodiment, occupy more or less of the volume of the reservoir 12. In an embodiment, the entire reservoir 12 is filled with the wick 11, such that essentially the reservoir 12, the wick 11 and the emission module 10 are formed from the same component.

The cartridge 76 can have a removable front plate 77.

The cartridge 76 can have a cartridge identifier 761 on the back of the cartridge 76. The cartridge identifier 761 can be readable by the communication interface 63 which can be arranged in the air enhancing device 1 adjacent to the cartridge identifier 761. The communication interface 63 is part of the electronics module 6. In a preferred embodiment, the cartridge identifier 761 is an RFID tag, which is attached to the back of the cartridge 76 in the form of an RFID label.

The ejector 512 is shown, along with the biasing mechanism 513. In a preferred embodiment, the biasing mechanism is a spring.

FIG. 20 shows a front section view of the cartridge 76. The cartridge 76 can have an air filter 13 arranged in a bottom part of the cartridge 76, the air filter 13 being formed of a mesh or foam or component configured to trap dust and/or other particulates. The air filter 13 can be removable.

The cartridge 76 can have two recesses 78 on opposing sides. The recesses can be formed in an outer shell of the cartridge 76.

The cartridge 76 has a reservoir 12 containing the fluid substance. In particular, the outer shell of the cartridge 76 can enclose the reservoir 12. An emission module 10 can be arranged in the cartridge 76, in particular in an upper part of the cartridge 76 above the reservoir 12. A wick 11 can fluidly connect the reservoir 12 with the emission module 10.

A flap 79 can cover a top of the emission module 10, such that when the flap 79 is in a closed state, as shown, the fluid substance contained in the reservoir 12 does not escape into the air. The flap can have a flap lever 791. The flap 79 can be held in the closed state by a flap biasing member 792, which acts in particular against the flap lever 791. The flap 79 is pivotably arranged such that when a force acts against the flap lever 791 the flap 79 opens, thereby allowing the fluid substance to escape from the emission module 10.

FIG. 21 shows a front section view of the cartridge 76 in an inserted state inside the air enhancing device 1, in particular inserted into the cartridge holder 7. The cartridge 76 is designed such that a substantial part of the exterior cross-section of the cartridge 76 has a shape corresponding to an interior cross-section of the air enhancing device 1, such that a close fit between the cartridge 76 and the air enhancing device 1 is achieved. This has a benefit of ensuring that a majority of the air drawn into the air enhancing device 1 is drawn in through the air filter 13.

The recesses 78 of the cartridge are designed to slidably engage with protrusions 712 of the air enhancing device 1. In particular, the protrusions 712 and the corresponding recesses 78 are arranged in an area of the screw receptacles 511.

The flap cam 682 connected to the actuator 68 is shown. As the flap cam 682 rotates, it engages with the flap lever 791, thereby opening the flap 79 against a closing force of the flap biasing member 792, for example a spring. The actuator 68 is preferably configured as a stepper motor which can rotate precisely through a pre-defined first angle range. The flap 79 is closed through back-rotation (or further rotation) of the flap cam 682, such that the biasing member 792 returns the flap 79 to an initial (closed) position.

FIG. 22 shows a top section view of the air enhancing device 1 with the cartridge 76 inserted. The cut of the section view is horizontally through the middle of the emission module 10 to show in particular the working mechanism of the flap cam 682 and the ejection cam 681, both of which are configured on the same axle of the actuator 68. It can be seen that in the inserted state, the retaining means 611, in particular a magnet, is adjacent to the cartridge magnet 762. The magnets can be permanent magnets. The magnets can also be embodied as electromagnets. Further, one of the retaining means, i.e. either the retaining means 611 of the air enhancing device 1 or the retaining magnet 762 of the cartridge 76 can comprise a ferromagnetic material, such as annealed iron.

As described above, the flap cam 682 is designed to act against the flap lever 791 thereby opening the flap 79 (not shown). The flap cam 682 opens the flap 79 after traveling through a defined first angle range, for example from 0° to 120°. The ejector cam 681 is designed to laterally move the retaining means 611, against the biasing member 612, from an initial position where the retaining means 611 are adjacent to the cartridge magnet 762 to a final position. In the final position, the magnetic attraction between the retaining means 611 and the cartridge magnet 762 is at least partially diminished such that the ejector means (not shown) eject the cartridge 76 at least partially from the air enhancing device 1, in particular the cartridge holder 7. The ejector cam 681 is operated in a second angle range, for example from 120° to 240° or even up to 360°.

FIG. 23 shows a front view of an air enhancing device 1 with a front cover 4 according to an embodiment of the invention. The front cover 4 is inserted into a front cover frame 3. The front cover 4 has a plurality of holes 41 which allow air to pass into and out of the air enhancing device 1. Alternatively, the front cover 4 has a central cut-out section 43 which is configured to receive the cartridge 76, the cartridge 76 having a front plate 77 which with a plurality of holes.

FIG. 24 shows a perspective view of the air enhancing device 1 which is exploded such that many components are simultaneously visible. Many of these components have been described in the previous Figures, in particular FIGS. 13 to 18. The air enhancing device 1 is configured to receive the cartridge 76. The air enhancing device 1 has, or is configured to engage with, a front cover 4 which has a central cut-out section 43 designed to fit the cartridge 76. The front cover 4 also has a plurality of retaining clips 42 designed to engage with the air enhancing device 1 to removably attach the front cover 4. Further, a front cover frame 3 is shown with a large central cut-out 31 for receiving the cartridge 76 along with a number of gaps 32 which align with the mounting holes 22 of the in-wall box 2 such that the front cover frame 3 is mounted to the wall using the same means as described above.

The fan 8, or microblower (not shown), and electronics module 6 of the air enhancing device 1 can be arranged in the base frame 5 such that they are accessible via the recess 711 of the cartridge holder 7. In particular, the input-output module of the electronics module 6 is accessible via the recess 711, ensuring that any status LEDS or buttons of the input-output module are hidden from view once the cartridge 76 has been inserted. The fan 8, or microblower, is arranged in the air enhancing device 1 substantially horizontally. The fan 8 can be a radial fan configured to drawn air into the fan 8 in an axial direction, in particular in a +y direction, and to expel air radially through a fan shroud 81, in particular in the +z direction. The fan 8 is arranged, in an example, at a small angle to the horizontal (i.e. to the z-x plane), such that the expelled air is blown at a slight inclination angle (e.g. in a range of 10° to 30°) to the horizontal over a top surface of the cartridge 76, in particular over the emission module 10 which is arranged on the top surface of the cartridge 76. Throughout this application, the fan 8 can be replaced by other air-propelling means, such as a microblower.

In an aspect of the invention, the cartridge 76 as disclosed herein is void of any electronic components, and all active electronic components are contained in the in-wall box.

The invention claimed is:

1. An air enhancing device for disseminating molecules and/or other substances into the air comprising:
    a base frame configured to be fixedly mounted in an in-wall box or an in-wall cavity in a wall of a building or in a panel of a human accessible space;
    a cartridge holder attached to the base frame and configured to receive a removable cartridge, the cartridge being designed to contain a fluid substance;
    a fan and/or microblower configured to draw air into the air enhancing device and to expel air containing at least a portion of the fluid substance out of the air enhancing device into the air; and
    a front cover arranged essentially flush with the wall or the panel, which front cover has a cut-out section designed to receive the removable cartridge.

2. The air enhancing device of claim 1, wherein the air enhancing device is configured to be largely concealed from view by being mounted essentially flush to the wall or panel.

3. The air enhancing device according to claim 1 further comprising a communication interface, the communication interface comprising a wireless communication module configured to transmit a status message indicating a fill-level of the cartridge, via a wireless transmission, to the external communication device.

4. The air enhancing device according to claim 1, further comprising an electronic module comprising a cartridge reader configured to read a machine-readable cartridge identifier from the cartridge, wherein the electronic module comprises a processor configured to:
    receive from the cartridge reader the cartridge identifier,
    determine authorization of the cartridge using the cartridge identifier and authorization data stored in the memory,
    store an authorization confirmation in the memory, if positive authorization has been determined, and
    store an authorization denial in the memory, if negative authorization has been determined.

5. The air enhancing device according to claim 1, wherein the air enhancing device is configured such that the fan and/or microblower draws air in through the cartridge and/or expels air out through the cartridge such that at least a portion of the fluid substance is absorbed by the air.

6. The air enhancing device according to claim 1, wherein the fan is a radial fan with a vertically oriented fan axis which draws air in axially and expels air radially, wherein the air enhancing device further comprises a fan shroud configured to direct the expelled air past an emissions module of the removable cartridge.

7. The air enhancing device according to claim 1, further comprising an electronic module including a processor and a communication interface, wherein the processor is further configured
    to receive, using the communication interface, from the an external communication device, operating commands indicating one or more of: an intensity of emission, a time-interval of emission, or a type of emission.

8. A cartridge containing a fluid substance configured for use with an air enhancing device according to claim 1, wherein the cartridge is configured to be removably attached to a cartridge holder of the air enhancing device.

9. The cartridge according to claim 8, wherein the cartridge has a front plate designed with an at least partially complementary shape to a cut-out section of a front cover of an air enhancing device, wherein the front plate has a plurality of holes.

10. The cartridge according to claim 8, further including a machine-readable cartridge identifier configured to be read by a cartridge reader of the air enhancing device.

11. The cartridge according to claim 10, wherein the cartridge identifier further includes one or more of: a cartridge content type indicating a contained type of fluid substance, a cartridge volume indicator, or a cartridge expiry date.

12. The cartridge according to claim 8, further comprising an air filter configured to purify intake air flowing into the air enhancing device.

13. The cartridge according to claim 8, further comprising an emission module configured to distribute at least a portion of the fluid substance into the air.

14. The cartridge according to claim 13, wherein the emission module is configured to distribute a portion of the fluid substance into the air using evaporation.

15. The cartridge according to claim 13, wherein the emission module is in fluid communication with a reservoir of the cartridge containing the fluid substance.

16. The cartridge according to claim 13, wherein the emission module comprises a porous wick material configured to evaporate the fluid substance from a surface of the porous wick material.

17. The cartridge according to claim 13, further comprising a flap which is pivotably arranged to cover the emission module.

18. The cartridge according to claim 16, wherein the wicking material is T-shaped with the vertical bar extending into the reservoir and a top of the horizontal bar providing a surface for evaporation of the fluid substance.

19. A computer program product comprising a non-transient computer-readable medium having stored thereon computer program code configured to control a processor of an external communication device such that the external communication device performs the step of receiving, from an air enhancing device according to claim 1, one or more of: an identifier message comprising a cartridge identifier, a status message indicating a fill-level of the cartridge, an authorization message indicating an authorization confirmation or an authorization denial, or a refill message indicating a time-point of the cartridge requiring refilling or replacement.

20. The computer program product according to claim 19, wherein the computer program code is further configured to control the processor of the external communication device such that the external communication device performs the step of transmitting, to the air enhancing device, an emission program including time intervals and intensities of emission of the fluid substance.

* * * * *